(12) United States Patent
Ko et al.

(10) Patent No.: US 9,754,343 B2
(45) Date of Patent: Sep. 5, 2017

(54) IMAGE PROCESSING APPARATUS, IMAGE PROCESSING SYSTEM, AND IMAGE PROCESSING METHOD

(71) Applicant: Samsung Electronics Co., Ltd., Suwon-si (KR)

(72) Inventors: Yoon-ho Ko, Seoul (KR); Hwa-hyun Cho, Seoul (KR); Jong-seon Kim, Seongnam-si (KR); Seung-joon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 354 days.

(21) Appl. No.: 14/306,929

(22) Filed: Jun. 17, 2014

(65) Prior Publication Data

US 2015/0016748 A1 Jan. 15, 2015

(30) Foreign Application Priority Data

Jul. 15, 2013 (KR) .................. 10-2013-0083153

(51) Int. Cl.
*G06K 9/32* (2006.01)
*G06T 1/20* (2006.01)

(52) U.S. Cl.
CPC ..................... *G06T 1/20* (2013.01)

(58) Field of Classification Search
CPC ............ G06T 1/20; G09G 3/3648; G09G 2310/0221; G09G 2310/0232; G09G 2320/0252; G09G 2320/106; G09G 2340/0435; G09G 2340/16; G09G 2370/08; G09G 5/395

USPC ...... 385/299; 345/204, 99, 98; 348/442, 441
See application file for complete search history.

(56) References Cited

U.S. PATENT DOCUMENTS

| 5,614,960 | A | * | 3/1997 | Chiba | G11B 27/28 348/415.1 |
| 5,734,419 | A | * | 3/1998 | Botsford, III | H04N 19/176 348/700 |
| 6,862,318 | B2 | | 3/2005 | Matsumura et al. | |
| 7,321,351 | B2 | | 1/2008 | Cheon | |
| 7,321,371 | B2 | | 1/2008 | Sawabe | |

(Continued)

FOREIGN PATENT DOCUMENTS

JP 2003 333540 11/2003
JP 2004-040655 2/2004
(Continued)

*Primary Examiner* — Mekonen Bekele
(74) *Attorney, Agent, or Firm* — Myers Bigel, P.A.

(57) ABSTRACT

Image processing apparatus, an image processing system, and an image processing method. The image processing apparatus includes: an input image processing unit for outputting global information of sample data obtained by sampling first image data and dividing and outputting the first image data into an N (where N is a positive integer equal to or greater than 2) number of split image data; and a frame rate conversion unit including an N number of frame rate converters, wherein each of the N number of frame rate converters converts a frame rate of corresponding split image data among the N number of split image data synchronized with the global information and outputs the frame rate converted split image data as split display data, wherein the split display data is to be displayed on one of an N number of display regions.

9 Claims, 26 Drawing Sheets

(56) References Cited

U.S. PATENT DOCUMENTS

| | | | |
|---|---|---|---|
| 7,940,241 B2 * | 5/2011 | Bae | G09G 3/3648 345/204 |
| 8,035,591 B2 | 10/2011 | Jung et al. | |
| 8,223,176 B2 | 7/2012 | Jeon et al. | |
| 8,274,602 B2 * | 9/2012 | Fujisawa | H04N 7/014 348/441 |
| 2001/0017890 A1 * | 8/2001 | Rhee | H04N 7/014 375/240.16 |
| 2003/0147468 A1 | 8/2003 | Matsumura et al. | |
| 2003/0161403 A1 * | 8/2003 | Yang | H04N 5/145 375/240.16 |
| 2005/0249288 A1 | 11/2005 | Ha | |
| 2005/0276327 A1 | 12/2005 | Lee et al. | |
| 2007/0071098 A1 | 3/2007 | Lee | |
| 2008/0186413 A1 * | 8/2008 | Someya | H04N 9/68 348/739 |
| 2008/0239143 A1 | 10/2008 | Shin et al. | |
| 2009/0122188 A1 | 5/2009 | Hanaoka et al. | |
| 2009/0222854 A1 * | 9/2009 | Cansler | H04N 7/17318 725/35 |
| 2009/0297051 A1 | 12/2009 | Nonaka et al. | |
| 2010/0040299 A1 | 2/2010 | Noh et al. | |
| 2010/0086216 A1 | 4/2010 | Lee et al. | |
| 2010/0118185 A1 | 5/2010 | Furukawa et al. | |
| 2010/0128169 A1 * | 5/2010 | Yi | H04N 7/0125 348/441 |
| 2010/0201719 A1 | 8/2010 | Kimura | |
| 2010/0266041 A1 | 10/2010 | Gish et al. | |
| 2010/0302214 A1 * | 12/2010 | Kim | G09G 3/20 345/204 |
| 2010/0302438 A1 * | 12/2010 | Fujisawa | H04N 7/014 348/441 |
| 2010/0329343 A1 | 12/2010 | Wu et al. | |
| 2011/0280312 A1 | 11/2011 | Gaur et al. | |
| 2012/0069147 A1 | 3/2012 | Todoroki | |
| 2012/0120190 A1 * | 5/2012 | Lee | H04N 13/0029 348/43 |
| 2012/0154527 A1 | 6/2012 | Dwivedula et al. | |
| 2014/0333739 A1 * | 11/2014 | Yang | H04N 13/0011 348/54 |

FOREIGN PATENT DOCUMENTS

| | | |
|---|---|---|
| JP | 2009-118226 | 5/2009 |
| JP | 2009-124278 | 6/2009 |
| JP | 2009-200985 | 9/2009 |
| JP | 2010-135885 | 6/2010 |
| JP | 2010-171609 | 8/2010 |
| JP | 2011-035450 | 2/2011 |
| KR | 1020000020082 A | 4/2000 |
| KR | 1020080032491 A | 4/2008 |
| KR | 1020100131671 A | 12/2010 |
| KR | 1020120022130 A | 3/2012 |

* cited by examiner

FIG. 2
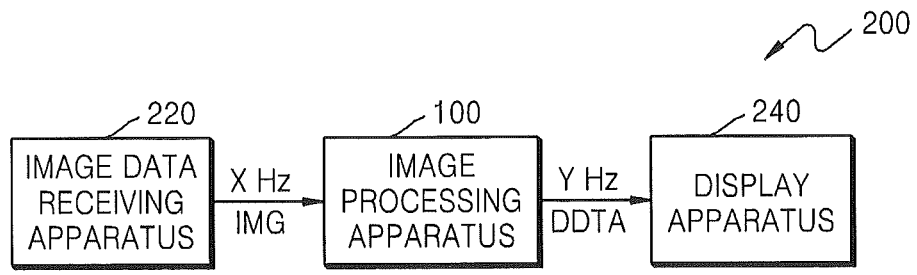
FIG. 3
| UD (Ultra Definition) | 3840 * 2160 | 120 Hz |
| | 7680 * 4320 | 240 Hz |
| FHD (Full High Definition) | 1920 * 1080 | 60 Hz |
FIG. 4
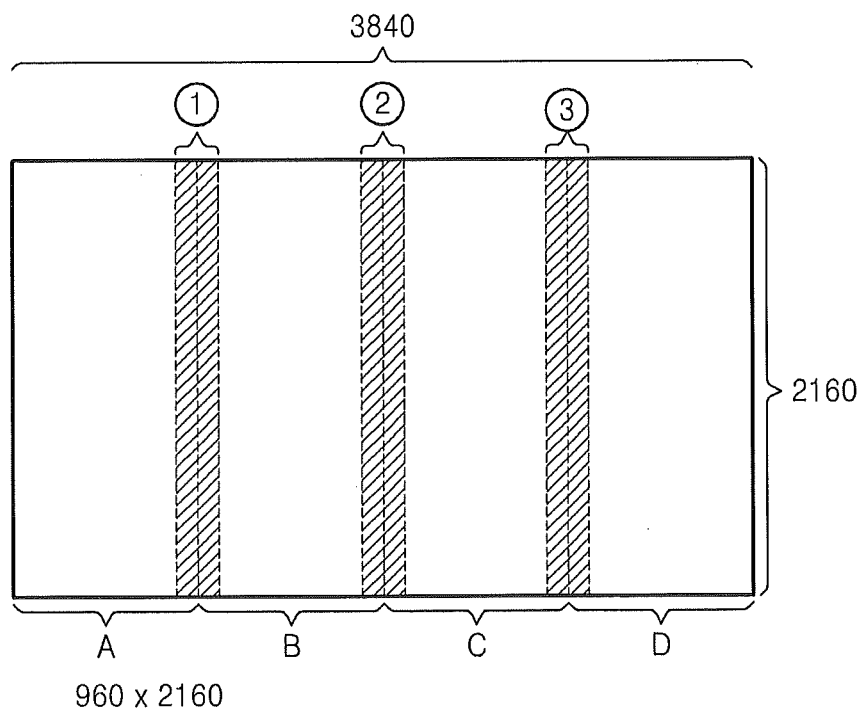

IMAGE PROCESSING APPARATUS, IMAGE PROCESSING SYSTEM, AND IMAGE PROCESSING METHOD

CROSS-REFERENCE TO RELATED APPLICATIONS

This application claims the benefit of Korean Patent Application No. 10-2013-0083153, filed on Jul. 15, 2013, in the Korean Intellectual Property Office, the disclosure of which is incorporated herein in its entirety by reference.

FIELD

Embodiments of the inventive concept relate to an image processing apparatus, an image processing system, and an image processing method.

BACKGROUND

Owing to development of communication networks and electronic devices, images are used in everyday life. Various efforts to realize a high resolution image have been made to meet the demand for high definition images. Image processing may need to be improved for high resolution. However, time and resources may be limited.

SUMMARY

Embodiments of the inventive concept provide an image processing apparatus, an image processing system, and an image processing method that may improve image data processing.

According to some embodiments of the inventive concept, there is provided an image processing apparatus including: an input image processing unit for outputting global information of sample data obtained by sampling first image data and dividing and outputting the first image data into an N (where N is a positive integer equal to or greater than 2) number of split image data; and a frame rate conversion unit including an N number of frame rate converters, wherein each of the N number of frame rate converters converts a frame rate of corresponding split image data among the N number of split image data synchronized with the global information and outputs the frame rate converted split image data as split display data, wherein the split display data is to be displayed on one of an N number of display regions.

According to some embodiments of the inventive concept, there is provided an image processing apparatus including: an input image processing unit for dividing and outputting first image data into an N (where N is a positive integer equal to or greater than 2) number of split image data; and a frame rate conversion unit including an N number of frame rate converters, wherein each of the N number of frame rate converters converts a frame rate of corresponding split image data among the N number of split image data and outputs the frame rate converted split image data as the split display data, wherein the split display data is to be displayed on one of an N number of display regions, wherein each of the N number of frame rate converters includes an internal memory having a quantity that is a sum of a first memory quantity required to store a motion vector of a line in a first direction of the split image data, a second memory quantity required to store a motion vector of a line in a second direction of the split image data, and a third memory quantity required to store a panning vector of the split image data.

According to some embodiments of the inventive concept, there is provided an image processing apparatus including: an input image processing unit for dividing and outputting first image data into an N (where N is a positive integer equal to or greater than 2) number of split image data; a frame rate conversion unit including an N number of frame rate converters, wherein each of the N number of frame rate converters converts a frame rate of corresponding split image data among the N number of split image data and outputs the frame rate converted split image data as the split display data, wherein the split display data is to be displayed on one of an N number of display regions; at least one encoder and decoder for receiving the first image data, the split image data, or the split display data and encoding and decoding the N number of split image data or the split display data; and a memory controller connected to the input image processing unit and the frame rate conversion unit via a bus, and controlling a memory disposed outside the image processing apparatus and storing the encoded split display data.

According to some embodiments, an image processing apparatus includes a frame rate conversion unit comprising a plurality of frame rate converters. Each of the plurality of frame rate converters is configured to receive split image data divided from image data, receive global information of the image data generated based on a difference between values of macro blocks between continuous frames of sample data sampled from the image data, convert a frame rate of the split image data synchronized with the global information and output the frame rate converted split image data. The global information may be applied to each of the plurality of frame rate converters. The global information may include at least one of a flash effect, a film mode, panning and a scene change.

BRIEF DESCRIPTION OF THE DRAWINGS

Exemplary embodiments of the inventive concept will be more clearly understood from the following detailed description taken in conjunction with the accompanying drawings in which:

FIG. 2 is a block flow diagram of an image processing system including the image processing apparatus of FIG. 1, according to an embodiment of the inventive concept;

FIG. 3 is a table showing a difference between ultra high definition (UHD) and full high definition (HD);

FIG. 4 is a diagram of an example of a panel of a display apparatus of FIG. 2;

DETAILED DESCRIPTION

Figure 1:
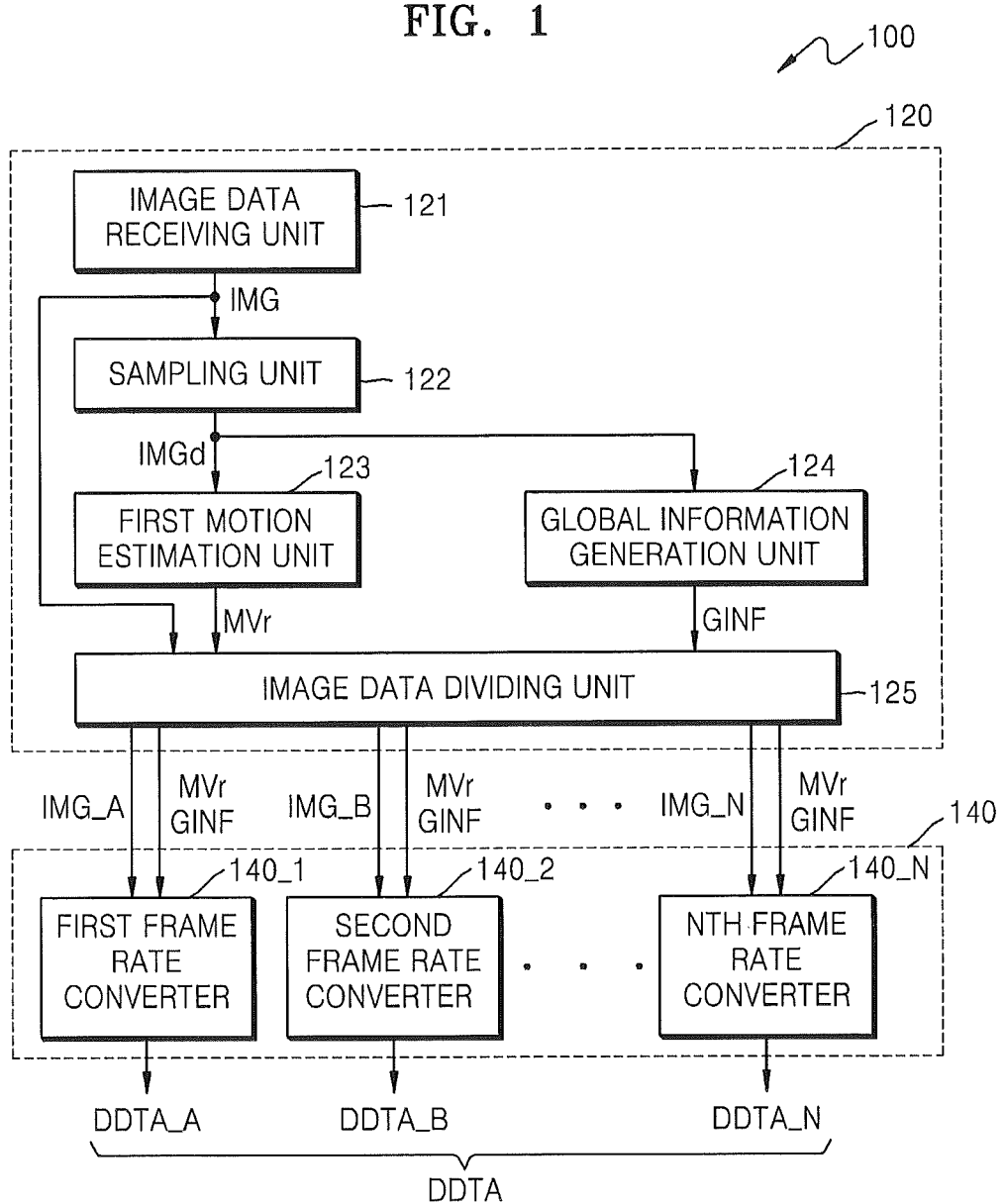
FIG. 1 is a block flow diagram of an image processing apparatus, according to an embodiment of the inventive concept.

Hereinafter, exemplary embodiments of the inventive concept will be described in detail with reference to the accompanying drawings. These embodiments are provided so that this disclosure will be thorough and complete and will fully convey the concept of the inventive concept to those of ordinary skill in the art. The inventive concept is not limited thereto and should be understood as covering all modifications, equivalents, and replacements that fall within the technical idea and scope of the inventive concept. In the drawings, the same reference numerals represent the same elements. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to limit the embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block flow diagram of an image processing apparatus 100, according to some embodiments of the inventive concept.

Referring to FIG. 1, the image processing apparatus 100 may be an image processor. For example, the image processing apparatus 100 may be an image processor that may process ultra high definition (UHD) image data IMG.

The image processing apparatus 100 may include an input image processing unit 120 and a frame rate conversion unit 140. The input image processing unit 120 outputs a reduced motion vector MVr and global information GINF of the image data IMG that is input into the image processing apparatus 100 and outputs the image data IMG as split image data IMG_A, IMG_B, . . . IMG_N. The input image processing unit 120 includes an image data receiving unit 121, a sampling unit 122, a first motion estimation unit 123, a global information generation unit 124, and an image data dividing unit 125. The image data receiving unit 121 receives the image data IMG.

FIG. 2 is a block flow diagram of an image processing system 200 including the image processing apparatus 100 of FIG. 1, according to an embodiment of the inventive concept. Referring to FIGS. 1 and 2, the image processing system 200 may include an image data receiving apparatus 220, the image processing apparatus 100, and a display apparatus 240. The image data receiving apparatus 220 may include a digital TV receiving system on chip (SoC). The image data receiving apparatus 220 may receive digital broadcasting by low voltage differential signaling (LVDS) and provide the image processing apparatus 100 with the digital broadcasting. The image data receiving apparatus 220 may provide the image data IMG at an optional hertz X Hz with the image data receiving unit 121 of the image processing apparatus 100. For example, the image data receiving apparatus 220 may transmit the image data IMG at 60 Hz.

FIG. 3 is a table showing a difference between UHD and full high definition (HD). Referring to FIG. 3, UHD has a resolution of 3840×2160 pixels or 7680×4320 pixels and is 4 or 16 times full HD having a resolution of 1920×1080. UHD reproduces 120 or 240 frames per second at 120 Hz or 240 Hz and has an output speed 2 or 4 times full HD of 60 Hz.

Referring to FIGS. 1 and 2, when the image processing apparatus 100 processes the UHD image data IMG, the image processing apparatus 100 may transmit display data DDTA to the display apparatus 240 at 120 Hz or 240 Hz. The display apparatus 240 receives and displays the display data DDTA. Although not shown in FIG. 2, the display apparatus 240 may include a panel, a voltage generator, a driver, an address generator, a controller, and memory to display the display data DDTA.

FIG. 4 is a diagram of an example of a panel of the display apparatus 240 of FIG. 2. Referring to FIGS. 2 and 4, the panel of the display apparatus 240 of the image processing system 200 may include an optional number of pixels. For example, when the image processing system 200 may process the UHD image data IMG, the panel of the display apparatus 240 may display 3840×2160 pixels. The panel of the display apparatus 240 may be divided into four display regions A, B, C, and D. When the panel of the display apparatus 240 includes 3840×2160 pixels, each of the four display regions A, B, C, and D may include 960×2160 pixels, but is not limited thereto. The panel including 3840×2160 pixels may be divided into a different number of display regions other than the 4 display regions. The four display regions A, B, C, and D may be divided into different shapes from those of FIG. 4. For example, each of the four display regions A, B, C, and D may include 1920×1080 pixels.

The image processing apparatus 100 may split and output the image data IMG into split display data DDTA_A, DDTA_B, DDTA_C, and DDTA_D of one of the four display regions A, B, C, and D. This will now be described.

Referring to FIG. 1, the image data receiving unit 121 transmits the received image data IMG to the image data dividing unit 125 and the sampling unit 122. The image data dividing unit 125 divides and outputs the image data IMG into the number of the four display regions A, B, C, and D of the panel of the display apparatus 240 of FIG. 2. The image data dividing unit 125 may divide and output the image data IMG into a plurality of split display data IMG_A, IMG_B, . . . IMG_N. For example, when the split display data DDTA_A, DDTA_B, DDTA_C, and DDTA_D is displayed on each of the four display regions A, B, C, and D, the image data dividing unit 125 may divide the image data IMG into the split display data IMG_A, IMG_B, IMG_C, and IMG_D.

Figure 5:
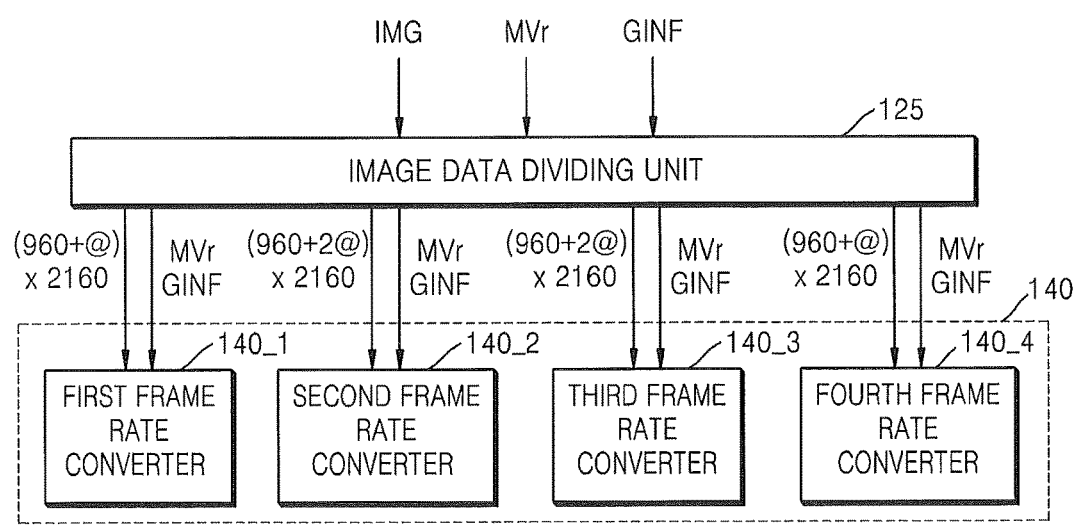
FIG. 5 is a block flow diagram of an example of an operation of an image data dividing unit of FIG. 1.

FIG. 5 is a block flow diagram of an example of an operation of the image data dividing unit 125 of FIG. 1. Referring to FIGS. 1 and 5, the image data dividing unit 125 may divide the image data IMG of 3840×2160 resolution into the split display data IMG_A, IMG_B, . . . IMG_N of 960×2160 or higher resolution. For example, when each of the four display regions A, B, C, and D includes 960×2160 pixels, the image data dividing unit 125 may generate each of the split display data IMG_A, IMG_B, IMG_C, and IMG_D to include the 960×2160 pixels and additionally an optional pixel for correcting artifacts of boundary regions ①, ②, and ③ between the adjacent display regions A, B, C, and D of FIG. 4. For example, when the optional pixel for correcting artifacts of the boundary regions ①, ②, and ③ between the adjacent display regions A, B, C, and D is @, the image data dividing unit 125 may generate each of the split display data IMG_A and IMG_D regarding the display regions A and D to include (960+@)×2160 pixels, and each of the split display data IMG_B and IMG_C regarding the display regions B and C to include (960+2@)×2160 pixels.

The sampling unit 122 samples the image data IMG and reduces a size thereof.

Figure 6:
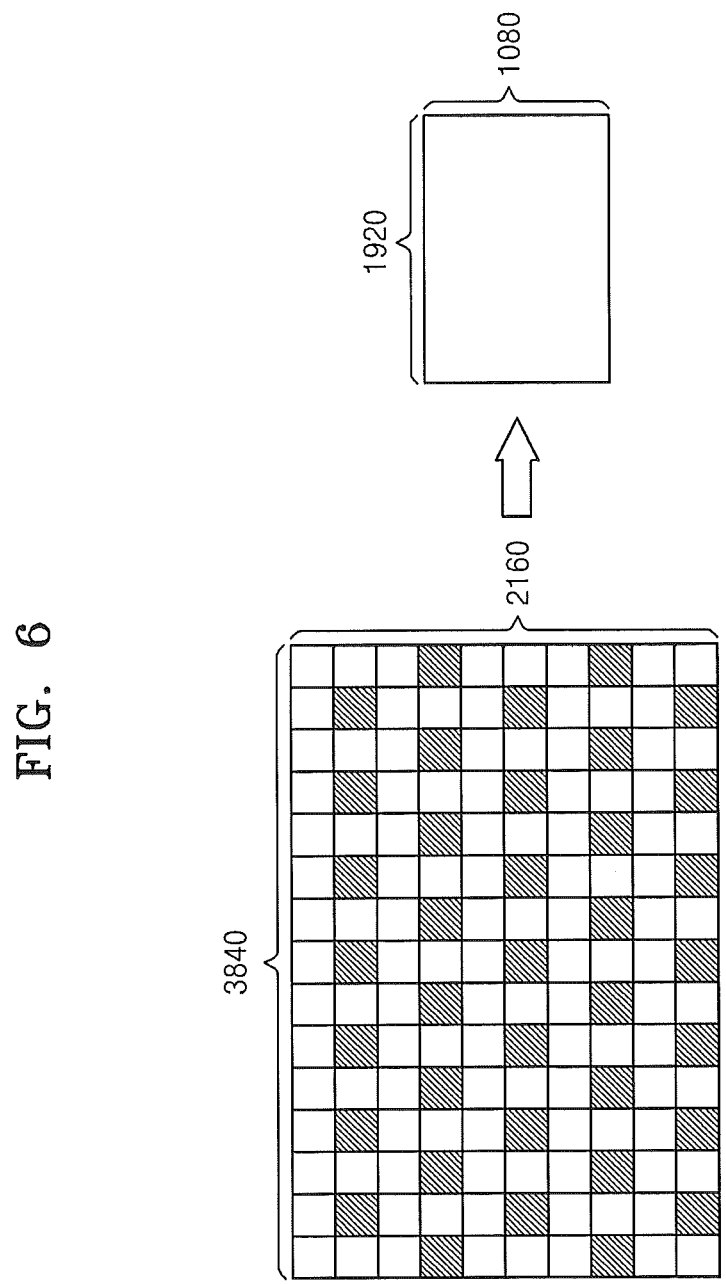
FIG. 6 is a diagram of an example of an operation of a sampling unit of FIG. 1.

FIG. 6 is a diagram of an example of an operation of the sampling unit 122 of FIG. 1. Referring to FIGS. 1 and 6, for example, the sampling unit 122 may sample a part of pixels of the image data IMG. For example, the sampling unit 122 may sample one of four pixels of the image data IMG. In this case, downscale data IMGd having a 1920×1080 resolution that is four times reduced from the image data IMG having a 3840×2160 resolution may be generated.

Referring to FIG. 1, the first motion estimation unit 123 performs motion estimation on the downscale data IMGd transmitted from the sampling unit 122 and calculates a reduction motion vector MVr. For example, the first motion estimation unit 123 may compare values of corresponding macro blocks between continuous frames of the downscale data IMGd and generate the reduction motion vector MVr according to a difference between the values.

The global information generation unit 124 generates global information GINF of the image data IMG based on the downscale data IMGd transmitted from the sampling unit 122. The global information GINF is information applied to all of the four display regions A, B, C, and D of FIG. 4. For example, the global information GINF may be information regarding a flash effect, a film mode, panning, or a scene change. For example, the global information generation unit 124 may generate the global information GINF based on the difference between the values of the macro blocks between the continuous frames of the downscale data IMGd. For example, when the difference between the values of the macro blocks between the continuous frames of the downscale data IMGd is greater than a reference value, the global information generation unit 124 may determine that the scene change takes place and generate the global information GINF of the scene change.

The reduction motion vector MVr generated by the first motion estimation unit 123 and the global information GINF generated by the global information generation unit 124 are applied to the image data dividing unit 125. The image data dividing unit 125 outputs the split image data IMG_A, IMG_B, . . . IMG_N, the reduction motion vector MVr, and the global information GINF. As such, the reduction motion vector MVr is generated and output, thereby reducing a bandwidth required to transmit data from the input image processing unit 120 to the frame rate conversion unit 140.

Referring to FIG. 1, the split image data IMG_A, IMG_B, . . . IMG_N, the reduction motion vector MVr, and the global information GINF that are output from the input image processing unit 120 are input to the frame rate conversion unit 140. The frame rate conversion unit 140 may include a plurality of first through Nth frame rate converters 140_1, 140_2, . . . 140_N. The number of the first through Nth frame rate converters 140_1, 140_2, . . . 140_N may correspond to the number of display regions of the panel of the display apparatus 240 of FIG. 2. For example, when the panel of the display apparatus 240 of FIG. 2 is divided into an N number of display regions, the image data IMG may be split into an N number of the split image data IMG_A, IMG_B, . . . IMG_N so that the frame rate conversion unit 140 may include an N number of frame rate converters 140_1, 140_2, . . . 140_N. The N number of first through Nth frame rate converters 140_1, 140_2, . . . 140_N may respectively receive the corresponding split image data IMG_A, IMG_B, . . . IMG_N and output the split display data DDTA_A, DDTA_B, . . . DDTA_N. For example, when the split display data DDTA_A, DDTA_B, DDTA_C, and DDTA_D are displayed on the four display regions A, B, C, and D as shown in FIG. 4, the frame rate conversion unit 140 may include the first through fourth frame rate converters 140_1, 140_2, 140_3, and 140_ 4. Each of the first through fourth frame rate converters 140_1, 140_2, 140_3, and 140_4 may include a separate chip.

For example, as shown in FIG. 5, when the image data dividing unit 125 divides the image data IMG into the four split image data IMG_A, IMG_B, IMG_C, and IMG_D, each of the first through fourth frame rate converters 140_1, 140_2, 140_3, and 140_4 of the frame rate conversion unit 140 may receive the corresponding split image data IMG_A, IMG_B, IMG_C, and IMG_D and generate the corresponding split display data DDTA_A, DDTA_B, DDTA_C, and DDTA_D. For example, the first frame rate converter 140_1 may generate the first split image data IMG_A as the first split display data DDTA_A, and the second frame rate converter 140_2 may generate the second split image data IMG_B as the second split display data DDTA_B. Likewise, the third frame rate converter 140_3 may generate the third split image data IMG_C as the third split display data DDTA_C, and the fourth frame rate converter 140_4 may generate the fourth split image data IMG_D as the fourth split display data DDTA_D. Operations of the first through fourth frame rate converters 140_1, 140_2, 140_3, and 140_4 will now be described below.

Figure 7:
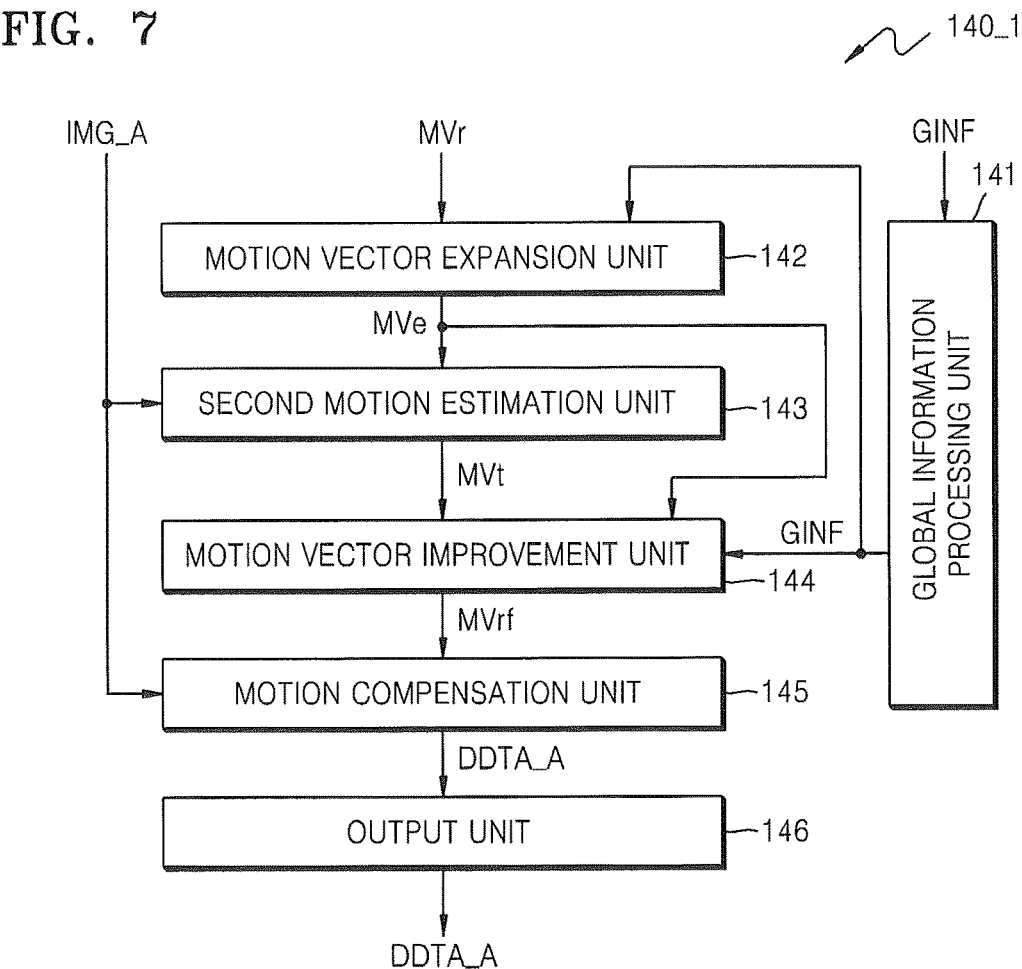
FIG. 7 is a block flow diagram of an example of a first frame rate converter of FIG. 1.

FIG. 7 is a block flow diagram of an example of the first frame rate converter 140_1 of FIG. 1. Referring to FIGS. 1 and 7, the first frame rate converter 140_1 may include a global information processing unit 141, a motion vector expansion unit 142, a second motion estimation unit 143, a motion vector improvement unit 144, a motion compensation unit 145, and an output unit 146. The first frame rate converter 140_1 may further include memory that will be described later.

The global information processing unit 141 may receive the global information GINF and transmit the global information GINF to the motion vector expansion unit 142 and the motion vector improvement unit 144. The motion vector expansion unit 142 may expand the reduction motion vector MVr to an expansion motion vector MVe. For example, the motion vector expansion unit 142 may calculate an average of reduction motion vector values of adjacent macro blocks of the first split image data IMG_A and generate a motion vector value of a new macro block between the adjacent macro blocks, and thus the reduction motion vector MVr may be expanded to the expansion motion vector MVe. The motion vector expansion unit 142 may expand the reduction motion vector MVr to the expansion motion vector MVe based on the global information GINF.

The second motion estimation unit 143 may receive the first split image data IMG_A and the expansion motion vector MVe, perform motion estimation on the first split image data IMG_A, and generate a temporary motion vector MVt. The operation of the second motion estimation unit 143 may be similar to the above-described first motion estimation unit 123.

The motion vector improvement unit 144 may receive the temporary motion vector MVt and improve the boundary region ① between the adjacent display regions of FIG. 4. For example, motion blur, or judder of an image of the boundary region ① between the adjacent display regions, for example, between the display regions A and B, may be reduced. The motion vector improvement unit 144 may use the expansion motion vector MVe to improve the boundary region ① between the adjacent display regions. This will now be described.

Figure 8:
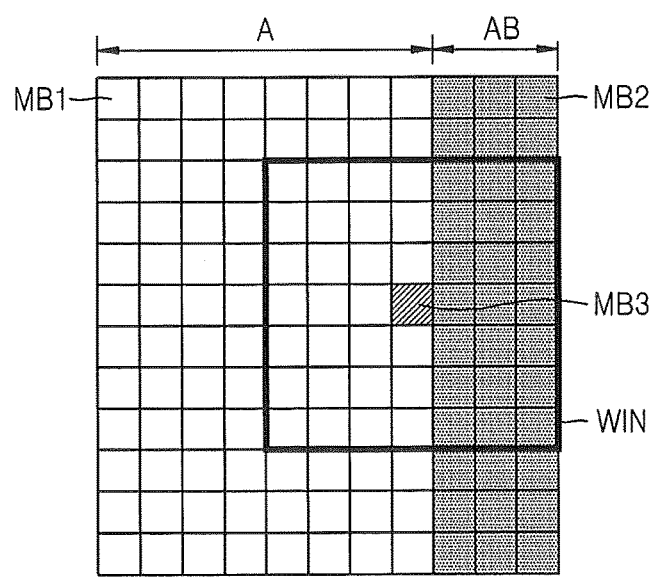
FIGS. 8 and 9 are diagrams for explaining an operation of a motion vector improvement unit of FIG. 7.
Figure 9:
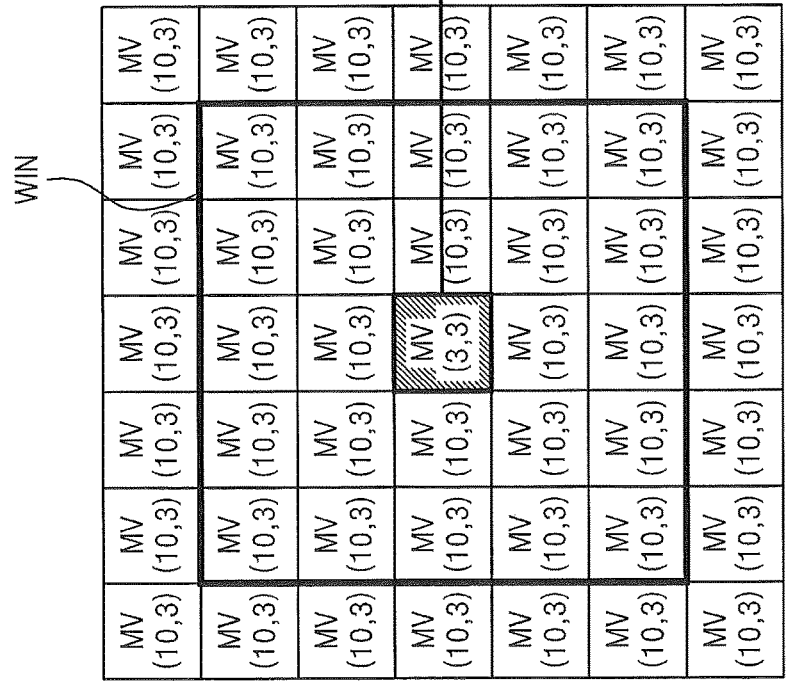

FIGS. 8 and 9 are diagrams for explaining an operation of the motion vector improvement unit 144 of FIG. 7. Referring to FIGS. 7 through 9, the motion vector improvement unit 144 sets a window WIN and acknowledges a value of the temporary motion vector MVt in the window WIN to improve the boundary region ①. FIG. 8 shows first macro blocks MB1 that are to be displayed on the first display region A, second macro blocks MB2 used to improve the boundary region ①, and a third macro block MB3 that is to be improved. Although FIG. 8 shows the one third macro block MB3 included in a region corresponding to the display region A, the inventive concept is not limited thereto. The third macro block MB3 may be included in a region AB used to improve the boundary region ① and a plurality of the third macro blocks MB3 may be used.

The value of the temporary motion vector MVt of each macro block in the window WIN may be, for example, shown as in FIG. 9. The value of the temporary motion vector MVt of the third macro block MB3 may not be consistent with values of the temporary motion vector MVt of other macro blocks in the window WIN. For example, the values of the temporary motion vector MVt of other macro blocks in the window WIN are (10,3), whereas the value of the temporary motion vector MVt of the third macro block MB3 in the window WIN may be (3,3). In this case, the motion vector improvement unit 144 may improve the third macro block MB3 and change the value of the temporary motion vector MVt of the third macro block MB3 from (3,3) to (10,3).

The values of the temporary motion vector MVt of other macro blocks in the window WIN are (10,3) in FIG. 9, for convenience of description, but the inventive concept is not limited thereto. The values of the temporary motion vector MVt of other macro blocks in the window WIN may be different from each other. For example, the values of the temporary motion vector MVt of other macro blocks in the window WIN may be different from each other when a value of the temporary motion vector MVt of an optional macro block (the third macro block MB3) is not consistent with the values of the temporary motion vector MVt of other macro blocks in the window WIN. In a further example, a value of the temporary motion vector MVt of a macro block may be reduced in a horizontal direction when the value of the temporary motion vector MVt of the third macro block MB3 is greater than a value of the temporary motion vector MVt of a macro block that is positioned prior to the third macro block MB3 in the horizontal direction.

Referring to FIGS. 7 through 9, the motion vector improvement unit 144 may improve the boundary region ① based on the global information GINF. The motion vector improvement unit 144 may improve the temporary motion vector MVt as described above and output an improvement motion vector MVrf. As described above, the motion vector improvement unit 144 may use the expansion motion vector MVe to improve the boundary region ① between the adjacent display regions. For example, the region AB of FIG. 8 may have a value of the expansion motion vector MVe. Thus, the first frame rate converter 140_1 may minimize information required to improve the boundary region ①.

The first frame rate converter 140_1 may freely set a size of the window WIN required to improve the boundary region ①. For example, when a boundary region is improved by using image data of an adjacent region, a required window may be limited to a size of a frame, whereas the expansion motion vector MVe is used by using a frame rate converter according to an embodiment, and thus the window may not be limited to the size of the frame.

Referring to FIG. 7, the motion compensation unit 145 receives the first split image data IMG_A and the improvement motion vector MVrf and generates the first split display data DDTA_A. For example, when the image data IMG transmitted from the image data receiving apparatus 220 of FIG. 2 has a frame rate of 60 Hz, the motion compensation unit 145 may change a frame rate from 60 Hz to 120 Hz. For example, the motion compensation unit 145 generates a new frame between two continuous frames of the first split image data IMG_A so that the first split image data IMG_A of 60 Hz to the first split display data DDTA_A of 120 Hz. The output unit 146 may receive the first split display data DDTA_A from the motion compensation unit 145 and output the first split display data DDTA_A to the display apparatus 240 of FIG. 2.

The other frame rate converters included in the frame rate conversion unit 140 may be the same as the above-described first frame rate converter 140_1. Thus, since each of the frame rate converters 140_1, 140_2 . . . 140_N operates in synchronization with the same global information GINF, boundary processing may be effectively performed between the frame rate converters 140_1, 140_2 . . . 140_N without having to exchange data for boundary processing. The frame rate conversion unit 140 of the image processing apparatus 200 may use the expansion motion vector MVe in processing the boundary regions ①, ②, and ③, thereby dramatically reducing an amount of information or data required to process the boundary regions ①, ② and ③. Thus, a chip size may be reduced by preventing an increase of resources.

Figure 10:
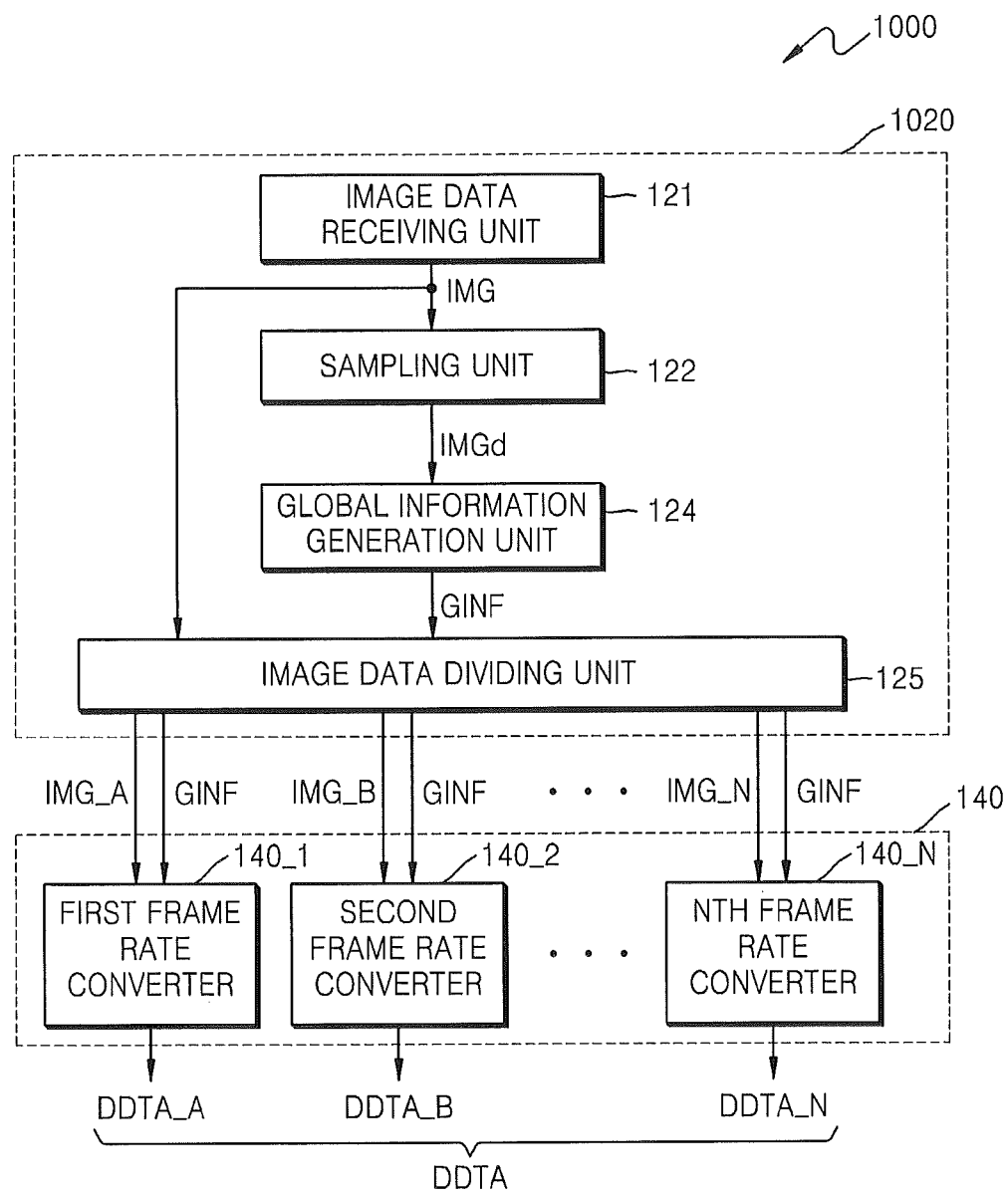
FIG. 10 is a block flow diagram of an image processing apparatus, according to another embodiment of the inventive concept.

FIG. 10 is a block flow diagram of an image processing apparatus 1000, according to some embodiments of the inventive concept. Referring to FIG. 10, the image processing apparatus 1000 includes an input image processing unit 1020 and a frame rate conversion unit 140. The input image processing unit 1020 outputs the global information GINF of the image data IMG that is input to the image processing apparatus 1000 and outputs the image data IMG as the split image data IMG_A, IMG_B, . . . IMG_N. The input image processing unit 1020 includes the image data receiving unit 121, the sampling unit 122, the global information generation unit 124, and the image data dividing unit 125. The image processing apparatus 1000 may receive the image data IMG and output the display data DDTA of different hertz (X Hz) from that of the image data IMG. For example, the image processing apparatus 1000 may process the image data IMG and output the display data DDTA.

The image data receiving unit 121 transmits the received image data IMG to the image data dividing unit 125 and the sampling unit 122. The image data dividing unit 125 divides and outputs the image data IMG into the number of display regions of a panel of the display apparatus 240 of FIG. 2. The image data dividing unit 125 may divide the image data IMG into the plurality of split image data IMG_A, IMG_B, . . . IMG_N. For example, when the split display data DDTA_A, DDTA_B, DDTA_C, and DDTA_D are displayed on the four display regions A, B, C, and D respectively as shown in FIG. 4, the image data dividing unit 125 may divide the image data IMG into the four split image data IMG_A, IMG_B, IMG_C, and IMG_D.

The image data dividing unit 125 may divide the image data IMG of 3840×2160 resolution into the split image data IMG_A, IMG_B, . . . IMG_N of 960×2160 or higher resolution. For example, when each of the four display regions A, B, C, and D of FIG. 4 includes 960×2160 pixels, the image data dividing unit 125 may generate each of the split display data IMG_A, IMG_B, IMG_C, and IMG_D to include the 960×2160 pixels and additionally an optional pixel for correcting artifacts of the boundary regions ①, ②, and ③ between the adjacent display regions A, B, C, and D.

The sampling unit 122 may sample the image data IMG, reduce a size of the image data IMG, and generate the downscale data IMGd. The global information generation unit 124 generates the global information GINF of the image data IMG based on the downscale data IMGd transmitted from the sampling unit 122. The image data dividing unit 125 outputs the global information GINF with the above-described split image data IMG_A, IMG_B, . . . IMG_N.

The split image data IMG_A, IMG_B, . . . IMG_N and the global information GINF that are transmitted from the input image processing unit 1020 are input to the frame rate conversion unit 140. The frame rate conversion unit 140 may include the plurality of first through Nth frame rate converters 140_1, 140_2, . . . 140_N. The number of the first through Nth frame rate converters 140_1, 140_2, . . . 140_N may correspond to the number of display regions of the panel of the display apparatus 240 of FIG. 2. For example, when the panel of the display apparatus 240 of FIG. 2 is divided into an N number of display regions, the image data IMG may be split into an N number of the split image data IMG_A, IMG_B, . . . IMG_N so that the frame rate conversion unit 140 may include the N number of frame rate converters 140_1, 140_2, . . . 140_N. The N number of first through Nth frame rate converters 140_1, 140_2, . . . 140_N may respectively receive the corresponding split image data IMG_A, IMG_B, . . . IMG_N and output the split display data DDTA_A, DDTA_B, . . . DDTA_N.

Unlike the input image processing unit 120 of FIG. 1, the frame rate conversion unit 140 may generate the reduction motion vector MVr, rather than the input image processing unit 1020 of FIG. 10. Alternatively, the frame rate conversion unit 140 may generate the temporary motion vector MVt of FIG. 7 directly from the split image data IMG_A, IMG_B, . . . IMG_N without the reduction motion vector MVr. In this case, each of the first through Nth frame rate converters 140_1, 140_2, . . . 140_N of the frame rate conversion unit 140 may not include the motion vector expansion unit 142, unlike in FIG. 7.

Figure 11:
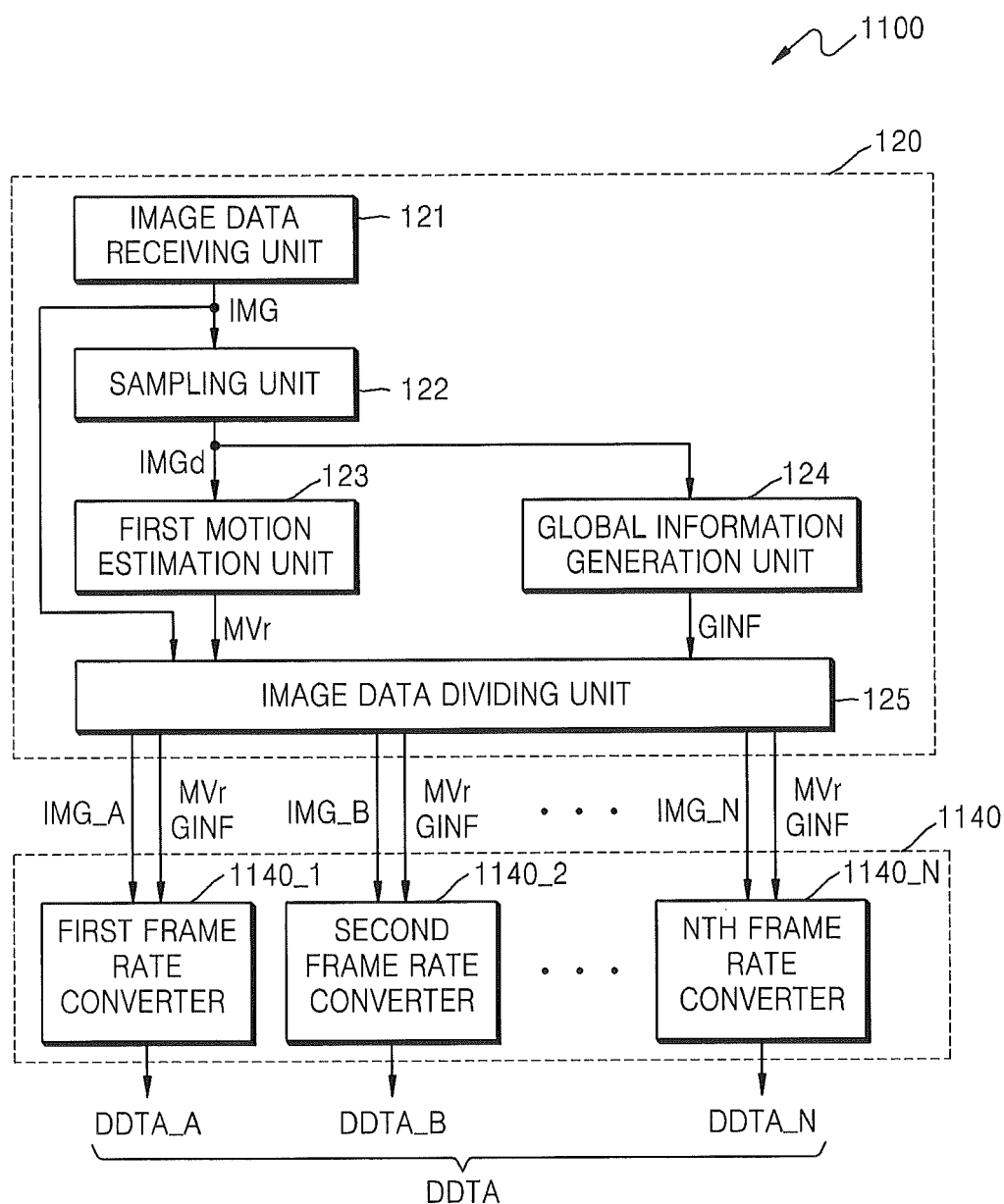
FIG. 11 is a block flow diagram of an image processing apparatus, according to another embodiment of the inventive concept.

FIG. 11 is a block flow diagram of an image processing apparatus 1100, according to another embodiment of the inventive concept. Referring to FIG. 11, the image processing apparatus 1100 according to another embodiment includes a frame rate and 3 dimension (D) conversion unit 1140. The input image processing unit 120 outputs the global information GINF of the image data IMG that is input to the image processing apparatus 1100 and outputs the image data IMG as the split image data IMA_, IMG_B, . . . IMG_N. The input image processing unit 120 includes the image data receiving unit 121, the sampling unit 122, the first motion estimation unit 123, the global information generation unit 124, and the image data dividing unit 125. The image processing apparatus 100 may receive the image data IMG and output the display data of different hertz X Hz from that of the image data IMG. For example, the image processing apparatus 1100 may process the UHD image data IMG and output the display data DDTA.

The image data receiving unit 121 transmits the received image data IMG to the image data dividing unit 125 and the sampling unit 122. The image data dividing unit 125 divides and outputs the image data IMG into the number of display regions of a panel of the display apparatus 240 of FIG. 2. The image data dividing unit 125 may split the image data IMG into the plurality of split image data IMG_A, IMG_B, . . . IMG_N. For example, the split display data DDTA_A, DDTA_B, DDTA_C, and DDTA_D are respectively displayed on the four display regions A, B, C, and D as shown in FIG. 4, and the image data dividing unit 125 may divide the image data IMG into the four split image data IMG_A, IMG_B, IMG_C, and IMG_D.

The image data dividing unit 125 may divide the image data IMG having a 3840×2160 resolution into the split image data IMG_A, IMG_B, . . . IMG_N having a 960× 2160 or higher resolution. For example, when each of the four display regions A, B, C, and D of FIG. 4 includes 960×2160 pixels, the image data dividing unit 125 may generate each of the split display data IMG_A, IMG_B, IMG_C, and IMG_D to include the 960×2160 pixels and additionally an optional pixel for correcting artifacts of the boundary regions ①, ②, and ③ between the adjacent display regions A, B, C, and D.

The sampling unit 122 may sample the image data IMG, reduce a size of the image data IMG, and generate the downscale data IMGd. The first motion estimation unit 123 performs motion estimation on the downscale data IMGd transmitted from the sampling unit 122 and calculate the reduction motion vector MVr. The global information generation unit 124 generates the global information GINF of the image data IMG based on the downscale data IMGd transmitted from the sampling unit 122. The image data dividing unit 125 outputs the global information GINF with the above-described split image data IMG_A, IMG_B, . . . IMG_N.

The split image data IMG_A, IMG_B, . . . IMG_N, the reduction motion vector MVr, and the global information GINF that are transmitted from the input image processing unit 1020 are input to the frame rate and 3D conversion unit 1140. The frame rate and 3D conversion unit 1140 may include a plurality of first through Nth frame rate and 3D converters 1140_1, 1140_2, . . . 1140_N. The number of the first through Nth frame rate and 3D converters 1140_1, 1140_2, . . . 1140_N may correspond to the number of display regions of the panel of the display apparatus 240 of FIG. 2. For example, when the panel of the display apparatus 240 of FIG. 2 is divided into an N number of display regions, the image data IMG may be split into an N number of the split image data IMG_A, IMG_B, . . . IMG_N so that the frame rate and 3D conversion unit 1140 may include the N number of frame rate and 3D converters 1140_1, 1140_2, . . . 1140_N. The N number of first through Nth frame rate converters 140_1, 140_2, . . . 140_N may respectively receive the corresponding split image data IMG_A, IMG_B, . . . IMG_N and output the split display data DDTA_A, DDTA_B, . . . DDTA_N that are converted into 3D data.

Figure 12:
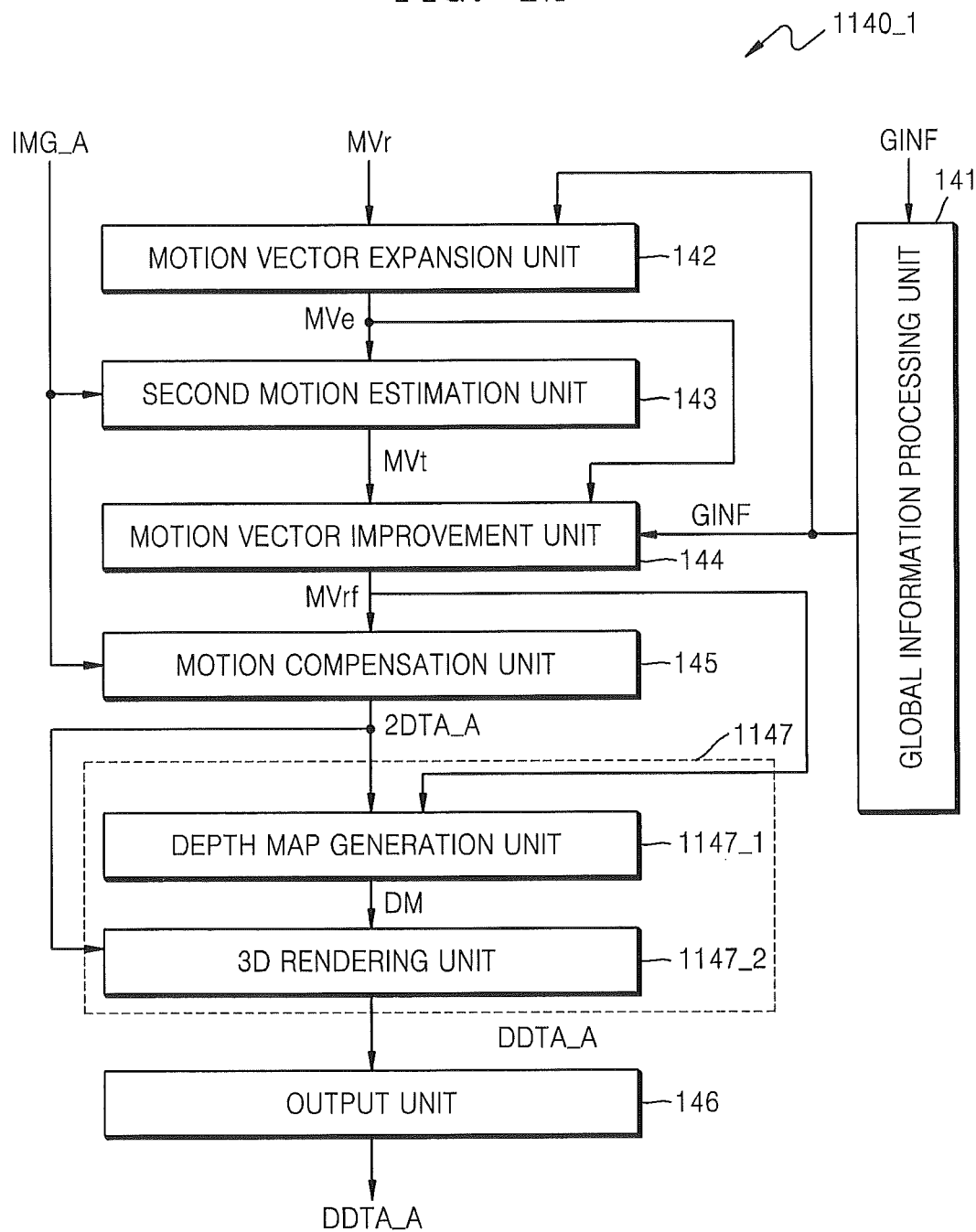
FIG. 12 is a block flow diagram of an example of a first frame rate and 3 dimension (D) converter of FIG. 11.

FIG. 12 is a block flow diagram of an example of the first frame rate and 3D converter 1140_1 of FIG. 11. Referring to FIGS. 11 and 12, the first frame rate and 3D converter 1140_1 may further include a 3D conversion unit 1147 unlike the first frame rate converter 140_1 of FIG. 7. The 3D conversion unit 1147 may include a depth map generation unit 1147_1 and a 3D rendering unit 1147_2. The depth map generation unit 1147_1 receives the improvement motion vector MVrf from the motion vector improvement unit 144, receives 2D first split display data 2DTA_A, and generates depth map information DM of the 2D first split display data 2DTA_A. The 3D rendering unit 1147_2 generates the 2D first split display data 2DTA_A as the 3D first split display data DDTA_A. Thus, the image processing apparatus 1100 of the present embodiment may perform frame rate conversion and 3D conversion by using the same chip.

Figure 13:
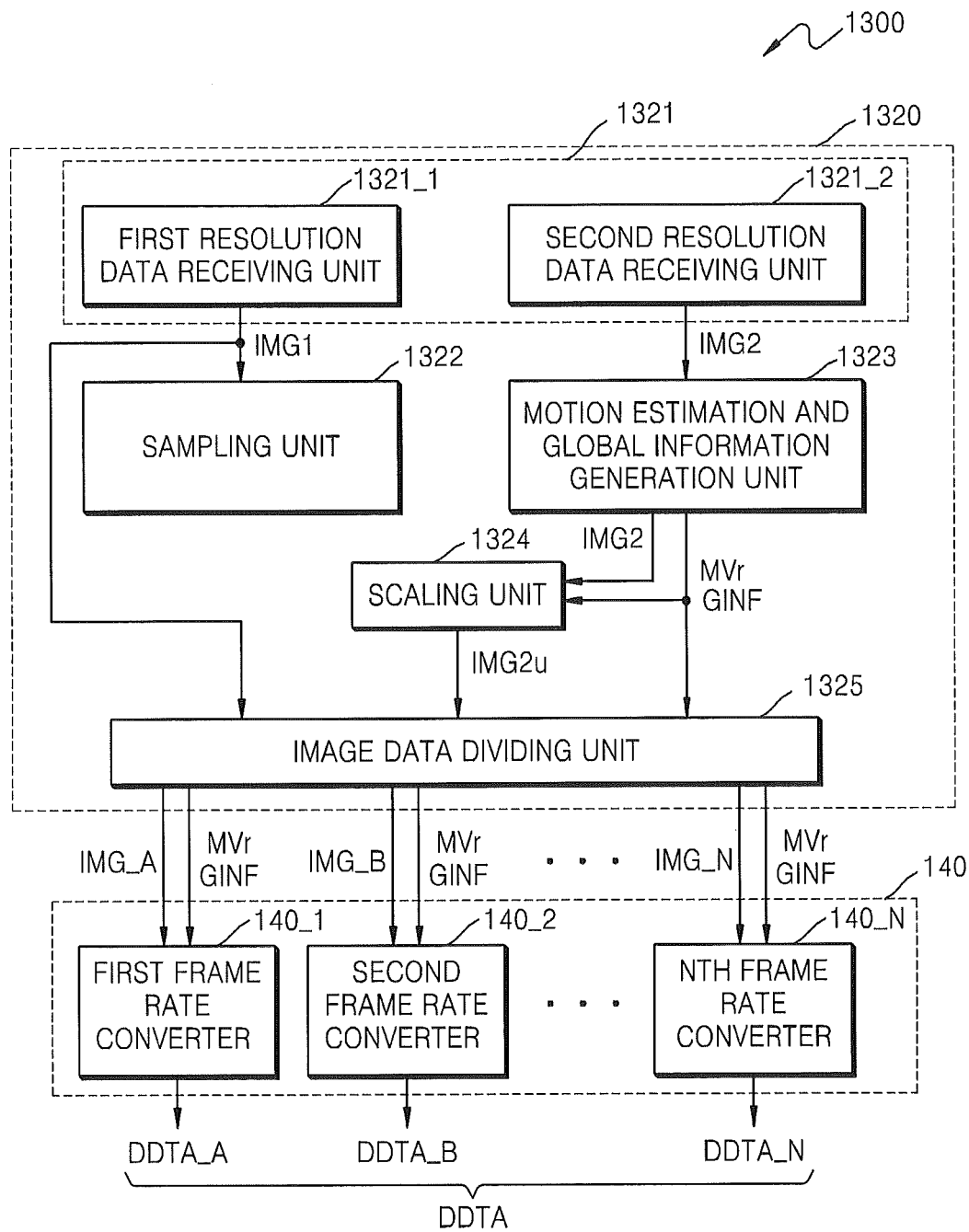
FIG. 13 is a block flow diagram of an image processing apparatus, according to another embodiment of the inventive concept.

FIG. 13 is a block flow diagram of an image processing apparatus 1300, according to some embodiments of the inventive concept. Referring to FIG. 13, the image processing apparatus 1300 may receive the image data IMG and output the display data DDTA of different hertz X Hz from that of the image data IMG. For example, the image processing apparatus 1300 may process UHD first image data IMG1 and output the display data DDTA. The image processing apparatus 1300 may process image data of different resolutions. For example, the image processing apparatus 1300 may receive the first image data IMG1 and full HD second image data IMG2. In this case, the image processing apparatus 1300 may convert the full HD second image data IMG2 into the UHD first image data IMG1 and generate the display data DDTA. This will now be described.

The image processing apparatus 1300 according to the present embodiment may include an input image processing unit 1320 and the frame rate conversion unit 140. The input image processing unit 1320 outputs the global information GINF of image data that is input to the image processing apparatus 1300 according to another embodiment and outputs the image data as the split image data IMG_A, IMG_B, . . . IMG_N.

The input image processing unit 1320 includes an image data receiving unit 1321, a sampling unit 1322, a motion estimation and global information generation unit 1323, a scaling unit 1324, and an image data dividing unit 1325. The image data receiving unit 1321 may include a first resolution data receiving unit 1321_1 that receives the first image data IMG1 and a second resolution data receiving unit 1321_2 that receives the second image data IMG2. The image data receiving apparatus 220 of FIG. 2 may identify and transmit the first image data IMG1 and the second image data IMG2 having different resolutions.

The first resolution data receiving unit 1321_1 receives the first image data IMG1 and transmits the first image data IMG1 to the sampling unit 1322 and the image data dividing unit 1325. The sampling unit 1322 may sample the image data IMG, reduce a size of the image data IMG, and generate the downscale data IMGd. The sampling unit 1322 may reduce, for example, the first image data IMG1 by 4 times.

The second resolution data receiving unit 1321_2 receives the second image data IMG2 and transmits the second image data IMG2 to the motion estimation and global information generation unit 1323. As described above, the first image data IMG1 may be UHD image data, and the second image data IMG2 may be full HD image data.

The motion estimation and global information generation unit 1323 performs motion estimation on the downscale data IMGd transmitted from the sampling unit 1322, calculates the reduction motion vector MVr, and generates the global information GINF based on the downscale data IMGd transmitted from the sampling unit 1322 or the second image data IMG2 transmitted from the second resolution data receiving unit 1321_2. As described above, when the first image data IMG1 is UHD image data, and the second image data IMG2 is full HD image data, the downscale data IMGd and the second image data IMG2 have the same resolution. The motion estimation and global information generation unit 1323 may transmit the reduction motion vector MVr and the global information GINF to the image data dividing unit 125. Furthermore, the motion estimation and global information generation unit 1323 may transmit the second image data IMG2 to the scaling unit 1324 when receiving the second image data IMG2.

The scaling unit 1324 generates upsize image data IMG2u obtained by upscaling the second image data IMG2 to a resolution of the first image data IMG1. For example, the scaling unit 1324 scales the full HD second image data IMG2 to UHD image data. For example, the scaling unit 1324 may calculate an average of motion vector values of macro blocks that are adjacent to each other left and right and/or up and down and insert a new macro block between the adjacent macro blocks, thereby performing upscaling.

The image data dividing unit 1325 divides and outputs the first image data IMG1 or the upsize image IMG2u into the number of display regions of a panel of the display apparatus 240 of FIG. 2. The image data dividing unit 1325 may divide the first image data IMG1 or the upsize image IMG2u into the plurality of split image data IMG_A, IMG_B, . . . IMG_N. For example, when the split display data DDTA_A, DDTA_B, DDTA_C, and DDTA_D are displayed on the four display regions A, B, C, and D respectively as shown in FIG. 4, the image data dividing unit 1325 may divide the first image data IMG1 or the upsize image IMG2u into the four split image data IMG_A, IMG_B, IMG_C, and IMG_D.

The image data dividing unit 1325 may divide the first image data IMG1 or the upsize image IMG2u having a 3840×2160 resolution into the split display data IMG_A, IMG_B, . . . IMG_N having a 960×2160 or higher resolution. For example, when each of the four display regions A, B, C, and D includes 960×2160 pixels, the image data dividing unit 1325 may generate each of the split display data IMG_A, IMG_B, IMG_C, and IMG_D to include the 960×2160 pixels and additionally an optional pixel for correcting artifacts of boundary regions ①, ②, and ③ between the adjacent display regions A, B, C, and D of FIG. 4. The image data dividing unit 1325 may output the reduction motion vector MVr and the global information GINF with the above-described split image data IMG_A, IMG_B, . . . IMG_N.

The split image data IMG_A, IMG_B, . . . IMG_N and the global information GINF that are output from the input image processing unit 1320 are input to the frame rate conversion unit 140. The frame rate conversion unit 140 may include the plurality of frame rate converters 140_1, 140_2, . . . 140_N. The number of the first through Nth frame rate converters 140_1, 140_2, . . . 140_N may correspond to the number of display regions of the panel of the display apparatus 240 of FIG. 2. For example, when the panel of the display apparatus 240 of FIG. 2 is divided into an N number of display regions, the image data IMG may be split into an N number of the split image data IMG_A, IMG_B, . . . IMG_N so that the frame rate conversion unit 140 may include the N number of frame rate converters 140_1, 140_2, . . . 140_N. The N number of first through Nth frame rate converters 140_1, 140_2, . . . 140_N may respectively receive the corresponding split image data IMG_A, IMG_B, . . . IMG_N and output the split display data DDTA_A, DDTA_B, DDTA_N. Each of the first through Nth frame rate converters 140_1, 140_2, . . . 140_N may be the same as those of FIG. 7.

Figure 14:
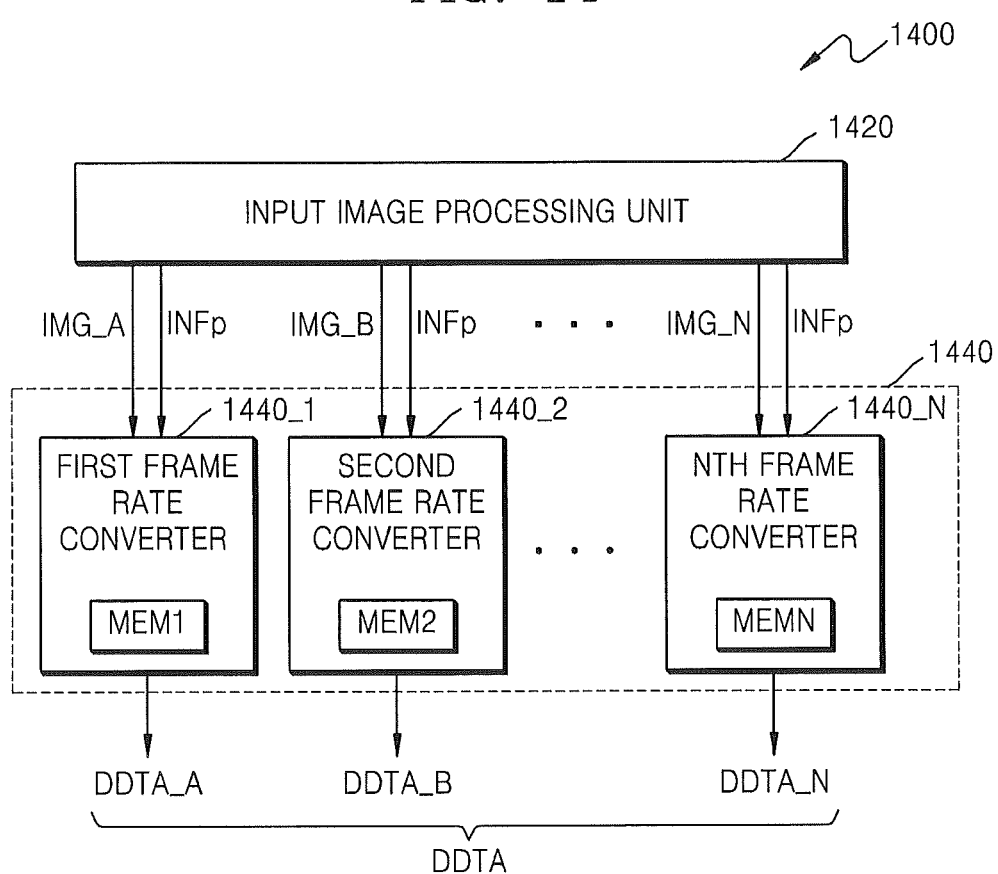
FIGS. 14 and 15 are block flow diagrams of an image processing apparatus, according to other embodiments of the inventive concept.

FIG. 14 is a block flow diagram of an image processing apparatus 1400, according to some embodiments of the inventive concept. Referring to FIG. 14, the image processing apparatus 1400 according to another embodiment includes an input image processing unit 1420 and a frame rate conversion unit 1440. The input image processing unit 1420 receives the image data IMG, divides the image data IMG into the number of display regions of a panel of the display apparatus 240 of FIG. 2, and outputs the split image data IMG_A, IMG_B, . . . IMG_N.

The input image processing unit 1420 extracts and outputs information INFp of the image data IMG. For example, the information INFp of the image data IMG may be the global information GINF that is common to the split image data IMG_A, IMG_B, . . . IMG_N. Alternatively, the information INFp of the image data IMG may be individual information INFp of each of the split image data IMG_A, IMG_B, . . . IMG_N. For example, the information INFp of the image data IMG may be information regarding whether the image data IMG is of panning scenes generated by using a method of moving a camera in accordance with a speed of a moving object or a travel direction thereof.

Figure 15:
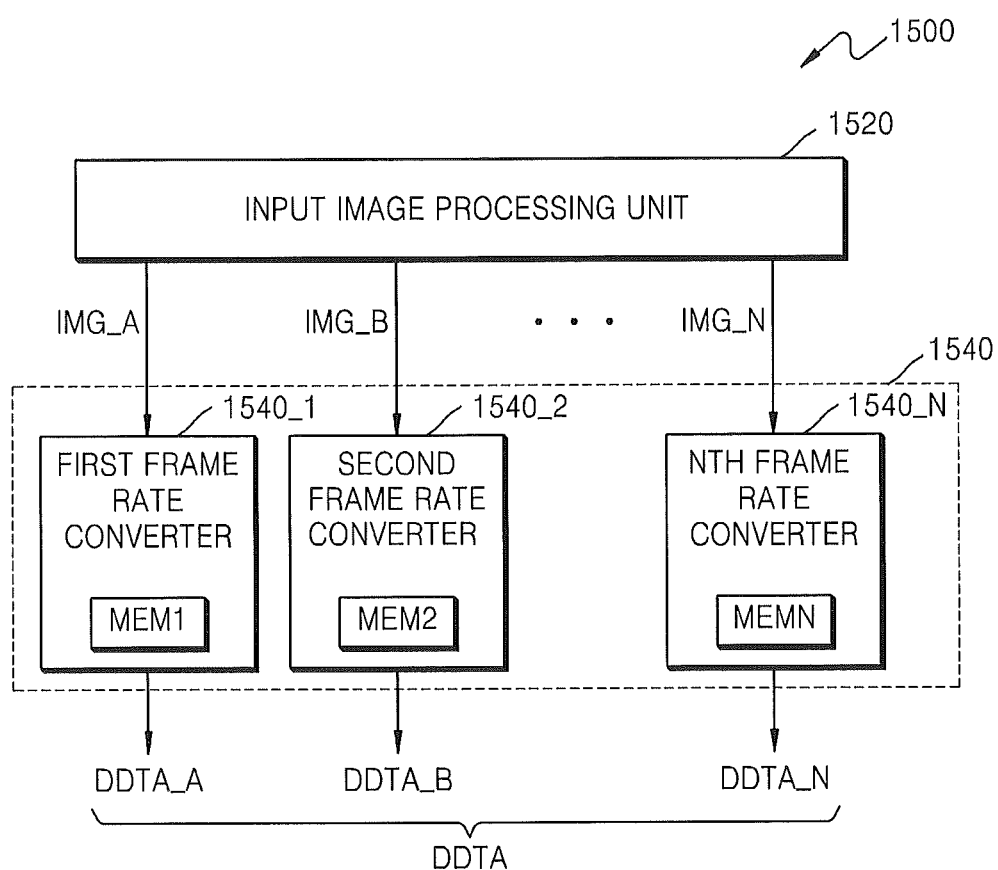

However, the inventive concept is not limited thereto. Referring to FIG. 15 that is a block flow diagram of an image processing apparatus 1500, according to some embodiments of the inventive concept, an input image processing unit 1520 may not generate the information INFp of the image data IMG but a frame rate conversion unit 1540 may generate the individual information INFp of each of the split image data IMG_A, IMG_B, . . . IMG_N.

Referring to FIG. 14, the split image data IMG_A, IMG_B, . . . IMG_N and the information INFp that are output from the input image processing unit 1420 are input to the frame rate conversion unit 1440. The frame rate conversion unit 1440 may include a plurality of first through Nth frame rate converters 1440_1, 1440_2, . . . 1440_N. The number of the first through Nth frame rate converters 1440_1, 1440_2, . . . 1440_N may correspond to the number of display regions of the panel of the display apparatus 240 of FIG. 2. For example, when the panel of the display apparatus 240 of FIG. 2 is divided into an N number of display regions, the image data IMG may be split into an N number of the split image data IMG_A, IMG_B, . . . IMG_N so that the frame rate conversion unit 1440 may include the N number of frame rate converters 1440_1, 1440_2, . . . 1440_N. The N number of first through Nth frame rate converters 1440_1, 1440_2, . . . 1440_N may respectively receive the corresponding split image data IMG_A, IMG_B, . . . IMG_N and output the split display data DDTA_A, DDTA_B, . . . DDTA_N. Each of the first through Nth frame rate converters 1440_1, 1440_2, . . . 1440_N may include memories MEM1, MEM2, . . . MEMN used to perform the above operations.

Figure 16:
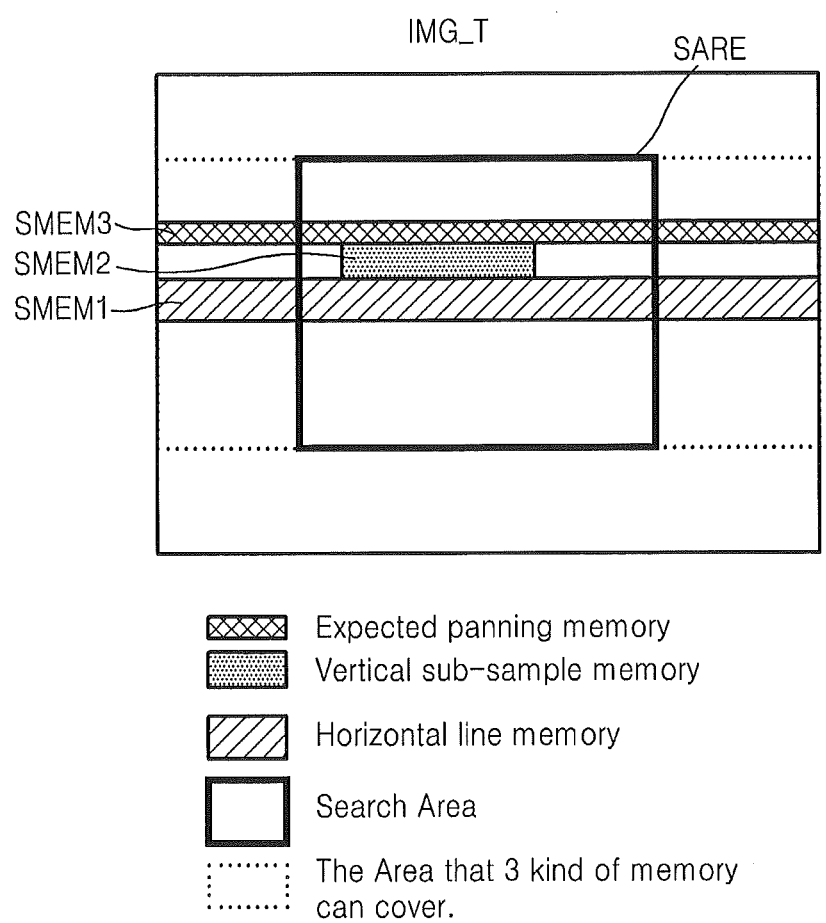
FIG. 16 is a diagram for explaining quantities of memories required to perform frame rate conversion.

FIG. 16 is a diagram for explaining quantities of the memories MEM1, MEM2, . . . MEMN required to perform frame rate conversion. Referring to FIG. 16, when a third frame IMG_T3 is interpolated between a first frame IMG_T1 and a second frame IMG_T2 of image data and a frame rate of the image data is converted, information included in a search region SARE of each of the first frame IMG_T1 and the second frame IMG_T2 needs to be stored in a memory so as to calculate an optional macro block MB_I of the third frame IMG_T3. Thus, a memory size increases, which increases a chip size. When an external memory is used, since data of the search region SARE is referred to from the memories MEM1, MEM2, . . . MEMN to calculate the macro block MB_I of the third frame IMG_T3, there is a problem in that a memory bandwidth greatly increases.

Figure 17:
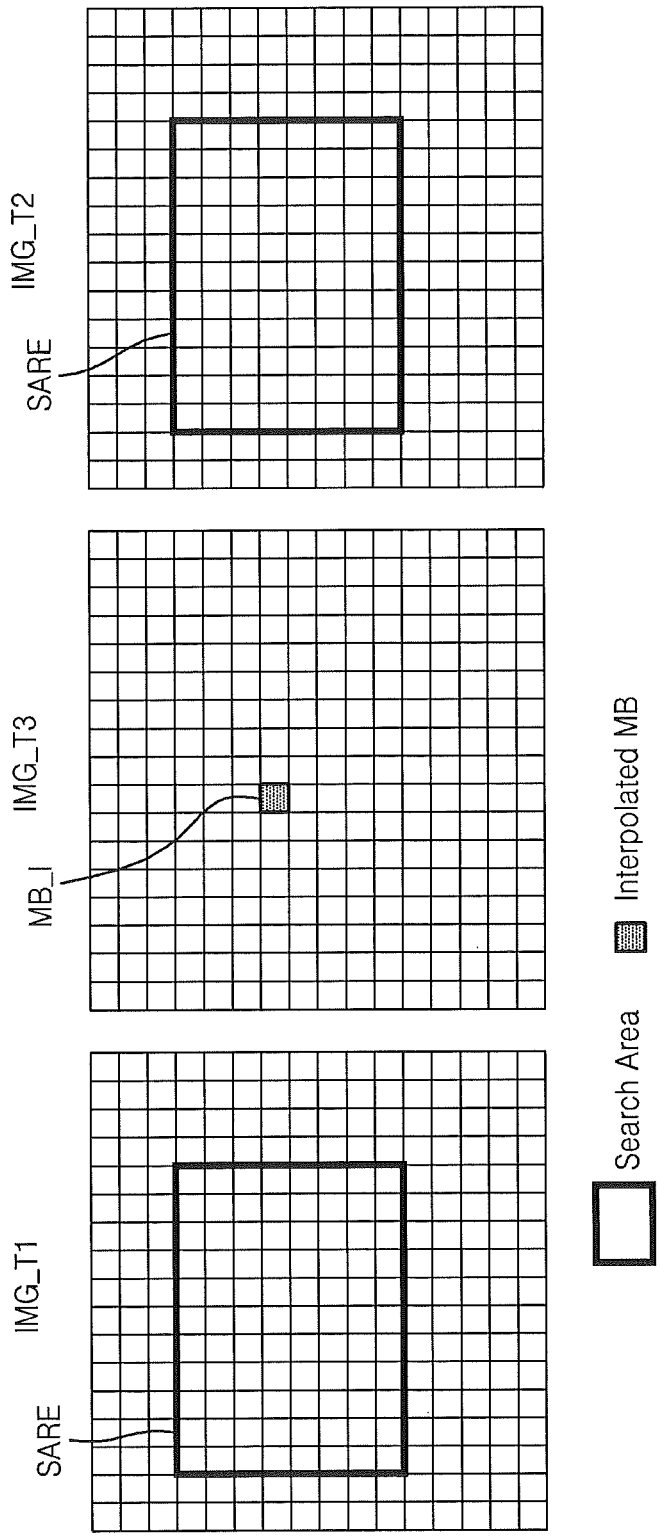
FIG. 17 is a conceptual diagram of required quantities of memories of FIG. 14.

FIG. 17 is a conceptual diagram of required quantities of the memories MEM1, MEM2, . . . MEMN of FIG. 14. Referring to FIGS. 14 through 17, the image processing apparatus 1400 requires quantities of the memories MEM1, MEM2, . . . MEMN that are a sum of a first memory quantity SMEM1, a second memory quantity SMEM2, and a third memory quantity SMEM3. However, although the quantities of the memories MEM1, MEM2, . . . MEMN may further include a quantity, in addition to the first memory quantity SMEM1, the second memory quantity SMEM2, and the third memory quantity SMEM3, memory quantities that will be described below may be limited to those required to perform interpolation in each of the frame rate converters 1440_1, 1440_2, . . . 1440_N.

The first memory quantity SMEM1 may be a memory quantity required to store data (or a motion vector) of a line with respect to a horizontal direction of the image data IMG. The second memory quantity SMEM2 may be a memory quantity required to store sub sampling data (or a sub sampling motion vector) of data of a line with respect to a vertical direction of the image data IMG. The third memory quantity SMEM3 may be a memory quantity required to store a panning vector when the image data IMG is of a panning scene that occurs in a vertical direction. Each of the required first memory quantity SMEM1, the second memory quantity SMEM2, and the third memory quantity SMEM3 may be a data quantity required to process (interpolate) the image data IMG in the frame rate converters 1440_1, 1440_2, . . . 1440_N. The image data IMG has a large change in the vertical direction and a small change in the horizontal direction. Thus, when the image data IMG is of the panning scene, a motion vector and a panning vector of each frame of the image data IMG may have the almost same value. Therefore, the frame rate converters 1440_1, 1440_2, . . . 1440_N according to the present embodiment perform interpolation by using the first memory quantity SMEM1 when a size of an interpolated vector of the image data is smaller than that of an interpolated vector in a horizontal line, and the third memory quantity SMEM3 when the size of the interpolated vector of the image data is similar to that of the panning vector. If the size of the interpolated vector of the image data IMG is not smaller than that of the interpolated vector in the horizontal line or the size of the interpolated vector of the image data is not similar to that of the panning vector, for example, when a change occurs between continuous frames in the vertical direction, the frame rate converters 1440_1, 1440_2, . . . 1440_N perform interpolation by using the second memory quantity SMEM2. In FIG. 17, a sum of the first memory quantity SMEM1, the second memory quantity SMEM2, and the third memory quantity SMEM3 is smaller than the search region SARE described with reference to FIG. 16. Thus, the image processing apparatus 1400 may reduce a chip size by reducing a size of an internal memory.

Figure 18:
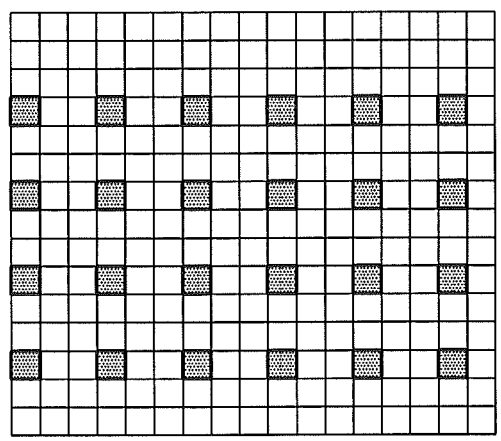
FIG. 18 is a diagram illustrating sampling data stored in a second memory of FIG. 17.

FIG. 18 is a diagram illustrating sampling data stored in a second memory of FIG. 17.

Figure 19:
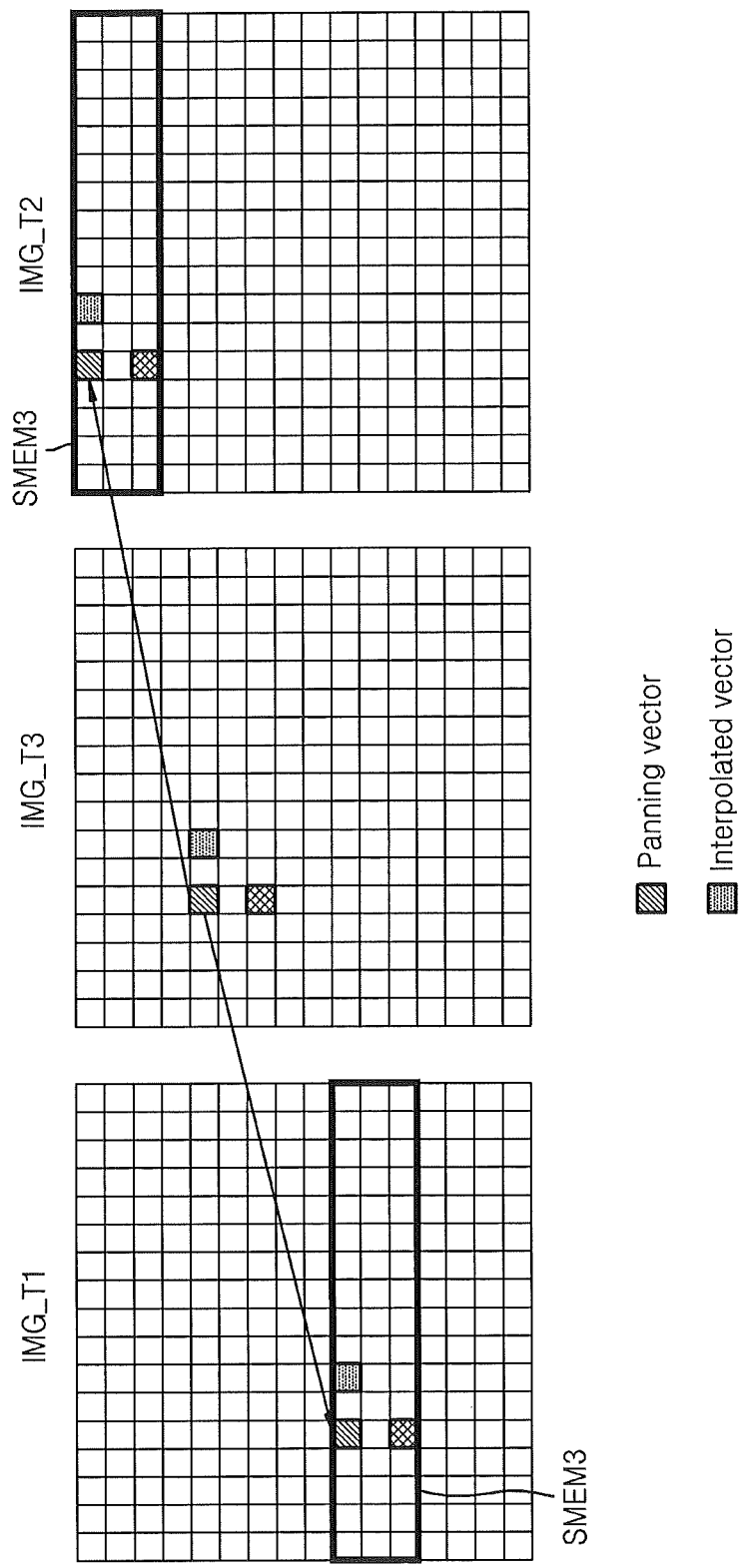
FIG. 19 is a diagram of an example in which frame rate converters of FIG. 14 perform interpolation by using a panning vector.

FIG. 19 is a diagram of an example in which the frame rate converters 1440_1, 1440_2, . . . 1440_N of FIG. 14 perform interpolation by using a panning vector. Referring to FIGS. 14 and 19, when the frame rate converters 1440_1, 1440_2, . . . 1440_N interpolate the third frame IMG_T3 between the first frame IMG_T1 and the second frame IMG_T2 of the corresponding split image data IMG_A, IMG_B, . . . IMG_N, if the panning vector is present, locations of macro blocks of the first frame IMG_T1 and the second frame IMG_T2 may be estimated as an arrow in FIG. 14 indicates. Whether the panning vector is present or not may be determined by using the global information GINF of FIG. 1.

Macro blocks may be set as a quantity of one of the first memory quantity SMEM1, the second memory quantity SMEM2, and the third memory quantity SMEM3. For example, as shown in FIG. 19, when the panning vector is present with respect to the first frame IMG_T1 and the second frame IMG_T2 of the split image data IMG_A, IMG_B, . . . IMG_N, a macro block used to interpolate the third frame IMG_T3 may be set as the third memory quantity SMEM3.

Figure 20:
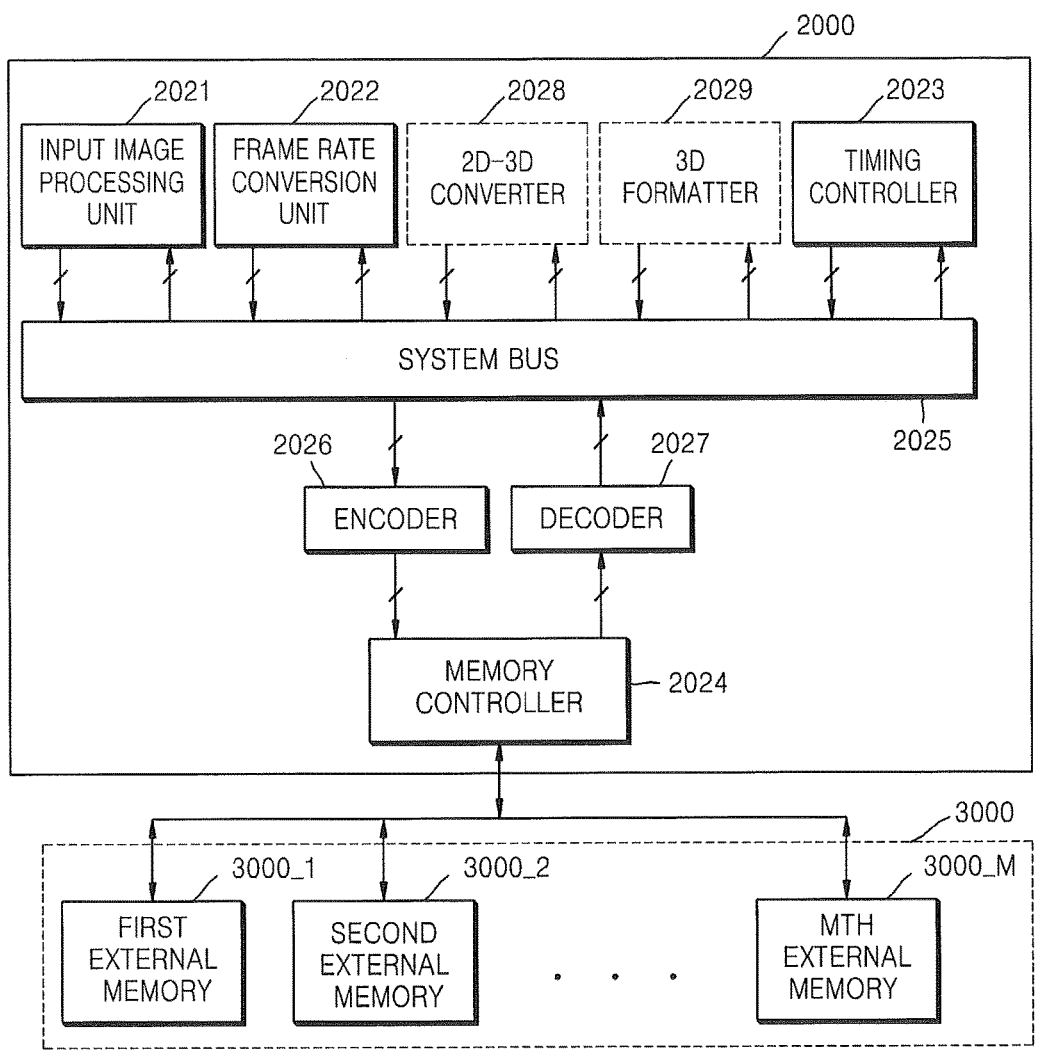
FIG. 20 is a block flow diagram of an image processing apparatus, according to another embodiment of the inventive concept.

FIG. 20 is a block flow diagram of an image processing apparatus 2000, according to some embodiments of the inventive concept. Referring to FIG. 20, the image processing apparatus 2000 may include a plurality of function blocks 2021, 2022, and 2023, a memory controller 2024, and a system bus 2025 that connects the function blocks 2021, 2022, and 2023 and the memory controller 2024.

The function blocks 2021, 2022, and 2023 may be the input image processing unit 2021, the frame rate conversion unit 2022, and the timing controller 2023. The input image processing unit 2021 and the frame rate conversion unit 2022 may be the same as the input image processing unit and the frame rate conversion described above. The frame rate conversion unit 140 of FIG. 1 described above may be connected to the input image processing unit 120 via the system bus 2025 like the frame rate conversion unit 2022 of FIG. 20.

The image processing apparatus 2000 may further include a 2D-3D converter 2028 and a 3D formatter 2029. The 2D-3D converter 2028 and the 3D formatter 2029 may be included in the frame rate conversion unit 140 of FIG. 1 described above. The image processing apparatus 2000 transmits or receives data to or from an external memory 3000. For example, the image processing apparatus 2000 may transmit the split display data DDTA_A, DDTA_B, DDTA_C, and DDTA_D processed by the image processing apparatus 100 of FIG. 1 to the external memory 3000.

The memory controller 2024 controls writing or reading data to or from the external memory 3000. Although the memory controller 2024 directly transmits data to the external memory 3000 in FIG. 20, the inventive concept is not limited thereto. For example, the memory controller 2024 may control data transmission and reception with the external memory 3000 via an interface (not shown) connected to the system bus 2025. The external memory 3000 may be a double data rate (DDR) memory.

The image processing apparatus 2000 may further include an encoder 2026 and a decoder 2027. The encoder 2026 and the decoder 2027 may be connected between the system bus 2025 and the memory controller 2024. The encoder 2026 and the decoder 2027 may reduce power consumption and electromagnetic interference (EMI) of the image processing apparatus 2000 by reducing a transition (a change in a bit value) number of data that is transmitted and received to and from the external memory 3000 or reducing the number of value 1 included in the data. When data is transmitted or received at high speed due to an increase in a bandwidth of the external memory 3000 according to an increase in resolution, a reduction in the power consumption and the EMI is considered as being important. Current consumption during image processing is reduced, and thus the power consumption is reduced, and the EMI is reduced or prevented, thereby reducing a malfunction of an image processing apparatus or an electronic apparatus including the image processing apparatus. EMI that occurs in a data transition, that is, during charging and discharging, may be reduced.

Power PW consumed in the image processing apparatus 2000 may be defined according to equation 1 below.

$$PW = C_{load} * V_{dd}^2 * f * P_t \qquad [\text{Equation 1}]$$

In equation 1 above, $C_{load}$ denotes a load capacitance, $V_{dd}$ denotes a supply voltage, f denotes an operating frequency, and $P_t$ denotes a switching activity factor. The switching activity factor indicates a data (bit) transition probability. The image processing apparatus 2000 may reduce power consumption by reducing a data transition number or reducing the number of value "1" included in the data.

Figure 21:
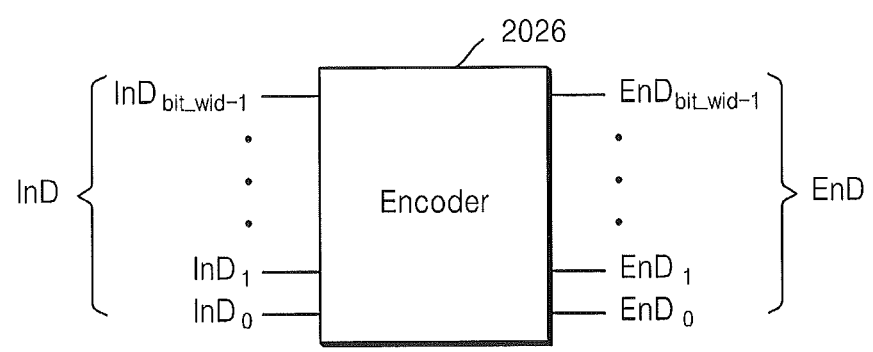
FIG. 21 is a conceptual diagram of an operation of an encoder of FIG. 20.

FIG. 21 is a conceptual diagram of an operation of the encoder 2026 of FIG. 20. Referring to FIGS. 20 and 21, the encoder 2026 receives input pixel data InD and encodes the input pixel data InD to encoded pixel data EnD. For example, the encoder 2026 encodes first input pixel data $InD_0$ and outputs first encoded pixel data $EnD_0$. The encoder 2026 encodes the input pixel data InD as the encoded pixel data EnD according to equation 2 below.

$$EnD_i(x,y) = InD_0(x,y), i=0$$

$$EnD_i(x,y) = InD_i(x,y) \oplus InD_{i-1}(x,y), 0 < i < \text{bit\_wid} \qquad [\text{Equation 2}]$$

In equation 2 above, bit_wid denotes a bit width, i.e. a bit number of data that is transmitted and received between the image processing apparatus 2000 and the external memory 3000. For example, if 32 bit data for one clock is transmitted and received between the image processing apparatus 2000 and the external memory 3000, bit_wid may be 32. The encoder 2026 may simultaneously process input pixel data $InD_0 \sim InD_{bit\_wid-1}$ having the same number as the bit width bit_wid, but is not limited thereto. The encoder 2026 may sequentially process the input pixel data $InD_0 \sim InD_{bit\_wid-1}$ having the same number as the bit width bit_wid. Although the encoder 2026 sequentially processes the input pixel data $InD_0 \sim InD_{bit\_wid-1}$ having the same number as the bit width bit_wid, the encoder 2026 may simultaneously output the encoded pixel data $EnD_0 \sim EnD_{bit\_wid-1}$ having the same number as the bit width bit_wid or an interface unit (not shown) of the image processing apparatus 2000 may simultaneously transmit the encoded pixel data $EnD_0 \sim EnD_{bit\_wid-1}$ having the same number as the bit width bit_wid to the external memory 3000.

In equation 2 above, (x,y) denotes a pixel location. For example, (x,y) of $InD_1$ is a pixel location corresponding to second input pixel data $InD_1$. For example, $InD_1(1,1)$ may indicate that the second input pixel data $InD_1$ is data of a pixel in a second row and a second column of a frame.

As in equation 2 above, the encoder 2026 outputs the first input pixel data $InD_0$ as the first encoded pixel data $EnD_0$. As in equation 2 above, the encoder 2026 performs exclusive OR on ith input pixel data $InD_i$ and i–1th input pixel data $InD_{i-1}$ and outputs ith encoded pixel data $InD_i$ regarding the input pixel data $InD_1 \sim InD_{bit\_wid-1}$ after the second input pixel data $InD_1$. The ith input pixel data $InD_i$ and the ith encoded pixel data $InD_i$ may indicate values of an i+1th bit of unit data (for example, the above-described 32 bit data) that is transmitted and received between the image processing apparatus 2000 and each of external memories 3000_1, 3000_2, . . . 3000_M.

The encoder 2026 performs the above operation on entire pixels. For example, if a resolution is 3840×2160, the encoder 2026 generates the encoded pixel data EnD regarding 3840 pixels in a horizontal direction in each of 2160 rows in a vertical direction.

Figure 22:
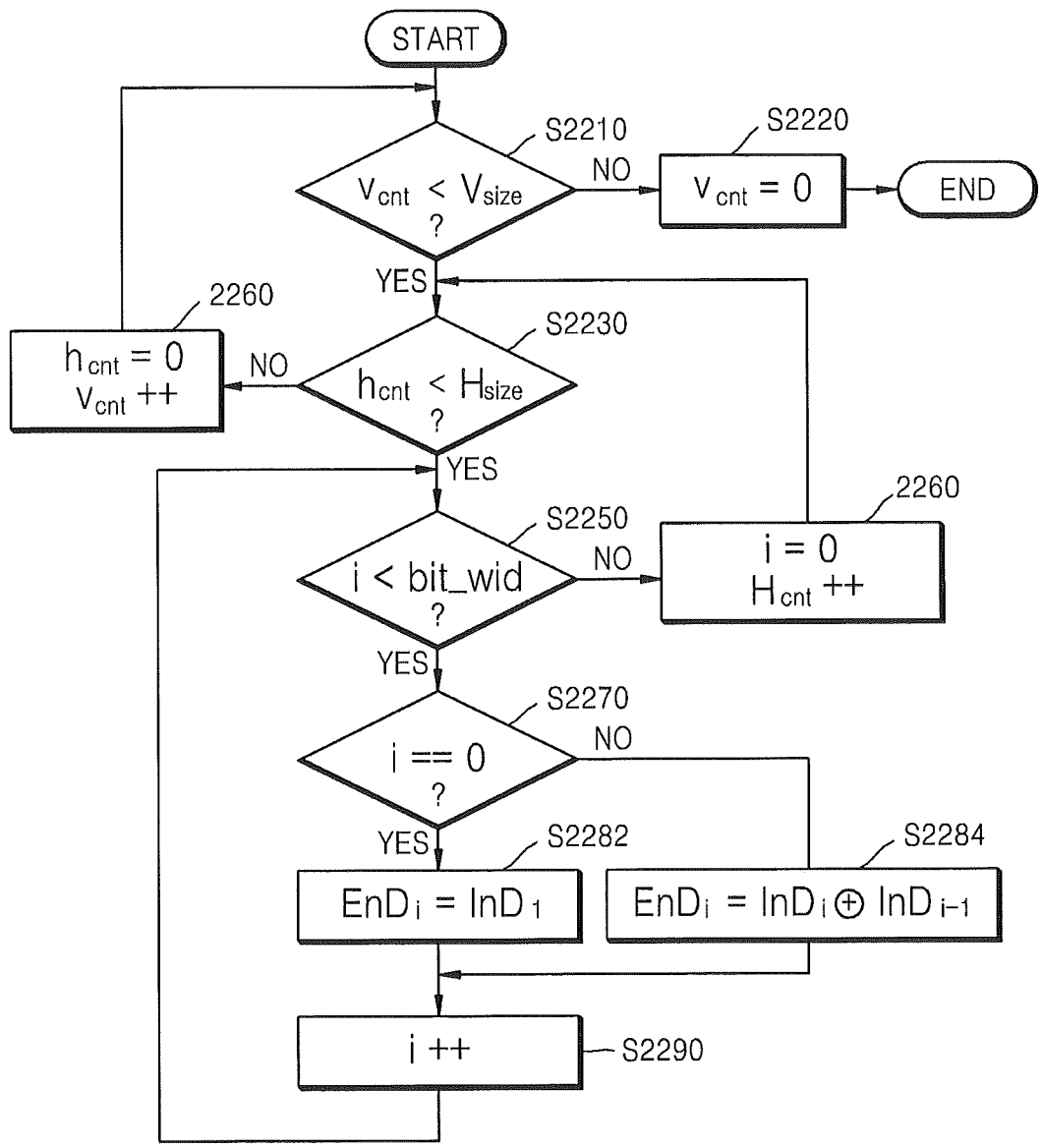
FIG. 22 is a flowchart for explaining the operation of the encoder of FIG. 21.

FIG. 22 is a flowchart for explaining the operation of the encoder 2026 of FIG. 21. Referring to FIGS. 21 and 22, a method of operating the encoder 2026 of the image processing apparatus 2000 determines whether an x value $v_{cnt}$ of the ith input pixel data $InD_i$ is smaller than a value $V_{size}$ of entire rows (operation S2210). For example, if the resolution is 3840×2160, the value $V_{size}$ of entire rows may be 2160. If the x value $v_{cnt}$ of the ith input pixel data $InD_i$ is greater than the value $V_{size}$ of entire rows, since the input pixel data InD is completely encoded, the x value $v_{cnt}$ of the ith input pixel data $InD_i$ is initialized ($v_{cnt}$=0) (operation S2220), and an encoding operation on a corresponding frame ends. If the x value $v_{cnt}$ of the ith input pixel data $InD_i$ is smaller than the value $V_{size}$ of entire rows (Yes of operation S2210), it is determined whether a y value $h_{cnt}$ of the ith input pixel data $InD_i$ is smaller than a value $H_{size}$ of entire rows (operation S2230).

For example, if the resolution is 3840×2160, the value $H_{size}$ of entire rows may be 3840. If the y value $h_{cnt}$ of the ith input pixel data $InD_i$ is greater than the value $H_{size}$ of entire rows (No of operation S2230), since the input pixel data InD of a corresponding row is completely encoded, the y value $h_{cnt}$ of the ith input pixel data $InD_i$ is initialized ($h_{cnt}$=0), and processing of a next row is prepared ($v_{cnt}$++) (operation S2240). That is, operation S2210 is fed back by increasing the x value $v_{cnt}$ of the ith input pixel data $InD_i$. If the y value $h_{cnt}$ of the ith input pixel data $InD_i$ is smaller than the value $H_{size}$ of entire rows (Yes of operation S2230), it is determined whether the ith input pixel data $InD_i$ is input pixel data of a transmission unit or an encoding unit, i.e. if i is smaller than bit_wid (operation S2250).

If the ith input pixel data $InD_i$ is not input pixel data within the bit width bit_wid (No of operation S2250), since input pixel data of a corresponding transmission unit is completely encoded, to encode input pixel data of a next transmission unit, i is initialized (i=0), and processing of the input pixel data of the next transmission unit is prepared ($h_{cnt}$++) (operation S2260). That is, operation S2230 is fed back by increasing the y value $h_{cnt}$ of the ith input pixel data $InD_i$. Since operations after operation S2230 are currently processed for the same row, processing of the input pixel data of the next transmission unit may be prepared by increasing the y value $h_{cnt}$ of the ith input pixel data $InD_i$.

If the ith input pixel data $InD_i$ is input pixel data within the bit width bit_wid (Yes of operation S2250), it is determined whether the ith input pixel data $InD_i$ is the first input pixel data $InD_0$, i.e. whether i is 0 (operation S2270). If the ith input pixel data $InD_i$ is the first input pixel data $InD_0$ (Yes of operation S2270), as in equation 2 above, the first input pixel data $InD_0$ is encoded as the first encoded pixel data $EnD_0$ (operation S2282). If the ith input pixel data $InD_i$ is not the first input pixel data $InD_0$ (Yes of operation S2270), as in equation 2 above, exclusive OR is performed on the ith input pixel data $InD_i$ and the i−1th input pixel data $InD_{i-1}$ and encoded as the ith encoded pixel data $EnD_i$ (operation S2284).

After the first encoded pixel data $EnD_0$ or the ith encoded pixel data $EnD_i$ is generated, to process input pixel data of a next bit, operation S2250 is fed back by increasing i (i++) (operation S2290).

Figure 23A:
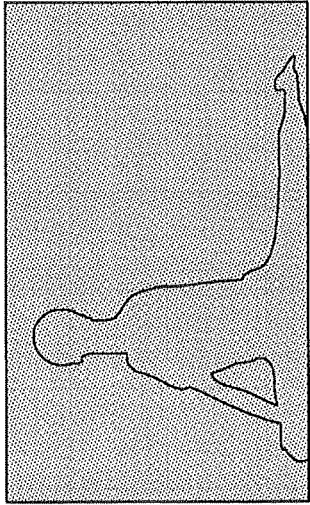
FIGS. 23A through 23D are diagrams of encoding results obtained by the encoder of FIG. 20.
Figure 23B:
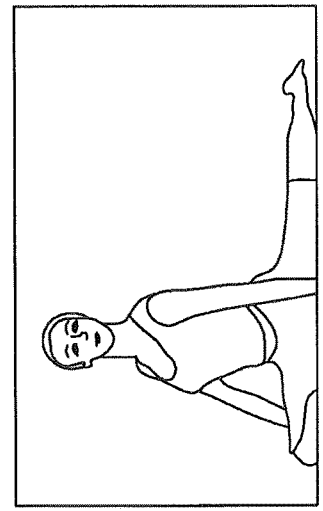
Figure 23C:
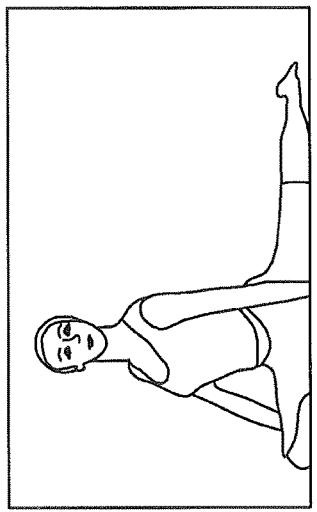
Figure 23D:
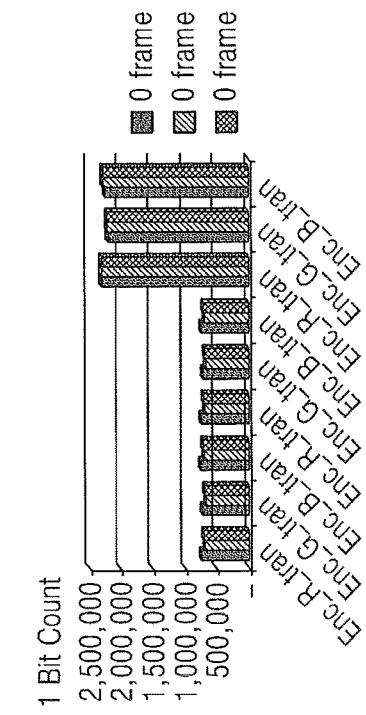

FIGS. 23A through 23D are diagrams of encoding results obtained by the encoder 2026 of FIG. 20. Referring to FIGS. 20 through 23D, a value of a pixel in which transition occurs in original image data (FIG. 23A) may be represented (FIG. 23B) by using the encoded pixel data EnD generated as described above. In this case, as shown in a simulations result of FIG. 23C, a value of 1 included in encoded image data may be reduced by 60% or higher compared to a value of 1 included in the original image data. That is, power consumed by the image processing apparatus 2000 may be reduced. As shown in FIG. 23D, although the encoded image data of FIG. 23B is decoded, a large deterioration in quality may not occur. A decoding method performed by the image processing apparatus 2000 will now be described below.

Figure 24:
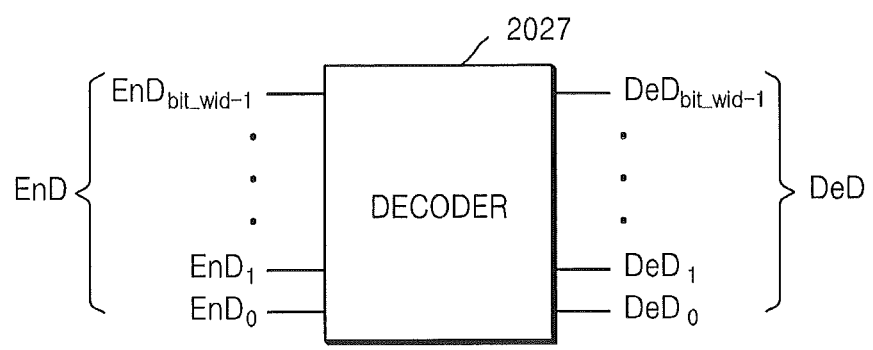
FIG. 24 is a conceptual diagram of an operation of a decoder of FIG. 20.

FIG. 24 is a conceptual diagram of an operation of the decoder 2027 of FIG. 20. Referring to FIGS. 20 and 24, the decoder 2027 receives the encoded pixel data EnD stored in the external memory 3000 and decodes decoded pixel data DeD. For example, the decoder 2027 decodes first encoded pixel data $EnD_0$ and outputs first decoded pixel data $DeD_0$. The decoder 2027 decodes the encoded pixel data EnD as the decoded pixel data DeD according to equation 3 below.

$$DeD_i(x,y)=EnD_0(x,y), i=0$$

$$DeD_i(x,y)=EnD_i(x,y) \oplus DeD_{i-1}(x,y), 0<i<\text{bit\_wid} \quad \text{[Equation 3]}$$

In equation 3 above, as described above, bit_wid denotes a bit width, i.e. a bit number of data that is transmitted and received between the image processing apparatus 2000 and the external memory 3000. For example, if 32 bit data for one clock is transmitted and received between the image processing apparatus 2000 and each of the external memories 3000_1, 3000_2, . . . 3000_M, bit_wid may be 32. The decoder 2027 may simultaneously decode the encoded pixel data $EnD_0$~$EnD_{bit\_wid-1}$ having the same number as the bit width bit_wid. Although the decoder 2027 sequentially processes the encoded pixel data $EnD_0$~$EnD_{bit\_wid-1}$ having the same number as the bit width bit_wid, the decoder 2027 may simultaneously output the decoded pixel data $DeD_0$~$DeD_{bit\_wid-1}$ having the same number as the bit width bit_wid. To this end, the decoder 2027 may include a buffer (not shown).

In equation 3 above, (x,y) denotes a pixel location as in equation 2. For example, (x,y) of $DeD_1$ is a pixel location corresponding to second decoded pixel data $DeD_1$. For example, $DeD_1(1,1)$ may indicate that the second decoded pixel data $DeD_1$ is data of a pixel in a second row and a second column of a frame.

As in equation 3 above, the decoder 2027 outputs the first encoded pixel data $EnD_0$ as the first decoded pixel data $DeD_0$. As in equation 3 above, the decoder 2027 performs exclusive OR on ith encoded pixel data $EnD_i$ and i−1th decoded pixel data $DeD_{i-1}$ and outputs ith decoded pixel data $DeD_i$ regarding the encoded pixel data $EnD_1$~$EnD_{bit\_wid-1}$ after the second encoded pixel data $EnD_1$. The ith decoded pixel data $DeD_i$ and the ith encoded pixel data $EnD_i$ may indicate values of an i+1th bit of unit data (for example, the above-described 32 bit data) that is transmitted and received between the image processing apparatus 2000 and each of external memories 3000_1, 3000_2, . . . 3000_M.

The decoder 2027 performs the above operation on entire pixels. For example, if a resolution is 3840×2160, the decoder 2027 generates the decoded pixel data DeD regarding 3840 pixels in a horizontal direction in each of 2160 rows in a vertical direction.

Figure 25:
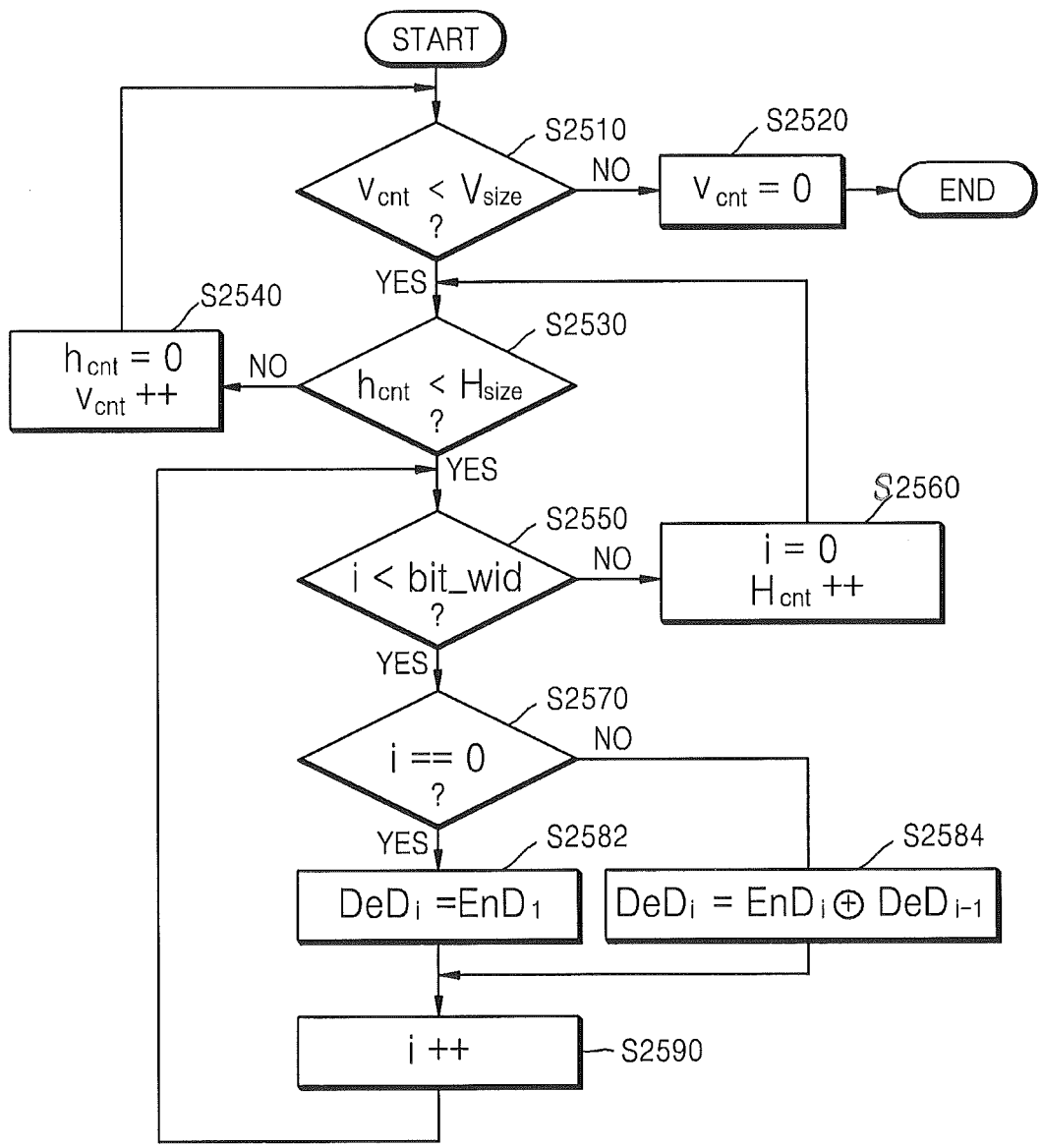
FIG. 25 is a flowchart for explaining the operation of the decoder of FIG. 24.

FIG. 25 is a flowchart for explaining the operation of the decoder 2027 of FIG. 24. Referring to FIGS. 24 and 25, a method of operating the decoder 2027 of the image processing apparatus 2000 determines whether an x value $v_{cnt}$ of the ith encoded pixel data EnD, is smaller than a value $V_{size}$ of entire rows (operation S2510). For example, if the resolution is 3840×2160, the value $V_{size}$ of entire rows may be 2160. If the x value $v_{cnt}$ of the ith encoded pixel data $EnD_i$ is greater than the value $V_{size}$ of entire rows (No of operation S2250), since the encoded pixel data EnD is completely decoded, the x value $v_{cnt}$ of the ith encoded pixel data $EnD_i$ is initialized ($v_{cnt}=0$) (operation S2520), and a decoding operation on a corresponding frame ends. If the x value $v_{cnt}$ of the ith encoded pixel data $EnD_i$ is smaller than the value $V_{size}$ of entire rows (Yes of operation S2510), it is determined whether a y value $h_{cnt}$ of the ith encoded pixel data $EnD_i$ is smaller than a value $H_{size}$ of entire rows (operation S2530).

For example, if the resolution is 3840×2160, the value $H_{size}$ of entire rows may be 3840. If the y value $h_{cnt}$ of the ith encoded pixel data $EnD_i$ is greater than the value $H_{size}$ of entire rows (No of operation S2530), since the encoded pixel data EnD of a corresponding row is completely encoded, the y value $h_{cnt}$ of the ith encoded pixel data $EnD_i$ is initialized ($h_{cnt}=0$), and processing of a next row is prepared ($v_{cnt}$++) (operation S2540). That is, operation S2510 is fed back by increasing the x value $v_{cnt}$ of the ith encoded pixel data $EnD_i$. If the y value $h_{cnt}$ of the ith encoded pixel data $EnD_i$ is smaller than the value $H_{size}$ of entire rows (Yes of operation S2530), it is determined whether the ith encoded pixel data $EnD_i$ is input pixel data of a transmission unit or an encoding unit, i.e. if i is smaller than bit_wid (operation S2550).

If the ith encoded pixel data $EnD_i$ is not input pixel data within the bit width bit_wid (No of operation S2550), since encoded pixel data of a corresponding transmission unit is completely encoded, to decode encoded pixel data of a next transmission unit, i is initialized (i=0), and processing of the input pixel data of the next transmission unit is prepared ($h_{cnt}$++) (operation S2560). That is, operation S2530 is fed back by increasing the y value $h_{cnt}$ of the ith encoded pixel data $EnD_i$. Since operations after operation S2530 are currently processed for the same row, processing of the encoded pixel data of the next transmission unit may be prepared by increasing the y value $h_{cnt}$ of the ith encoded pixel data $EnD_i$.

If the ith encoded pixel data $EnD_i$ is input pixel data within the bit width bit_wid (Yes of operation S2550), it is determined whether the ith encoded pixel data $EnD_i$ is the first input pixel data $EnD_0$, i.e. whether i is 0 (operation S2570). If the ith encoded pixel data $EnD_i$ is the first encoded pixel data $EnD_0$ (Yes of operation S2570), as in equation 3 above, the first encoded pixel data $EnD_0$ is decoded as the first decoded pixel data $DeD_0$ (operation S2582). If the ith encoded pixel data $EnD_i$ is not the first encoded pixel data $EnD_0$ (Yes of operation S2570), as in equation 3 above, exclusive OR is performed on the ith encoded pixel data EnD, and the i−1th decoded pixel data $DeD_{i-1}$ and encoded as the ith decoded pixel data $DeD_i$ (operation S2584).

After the first decoded pixel data $DeD_0$ or the ith decoded pixel data $DeD_i$ is generated, to process encoded pixel data of a next bit, operation S2550 is fed back by increasing i (i++) (operation S2590).

As described above, image data of which transition is reduced by the encoder 2026 and the decoder 2027 may be transmitted or received to or from the external memory 3000. Thus, although a resolution of image data that needs to be processed by the image processing apparatus 2000 increases and high speed processing is required, problems in which a band width for transmitting and receiving data to and from the external memory 3000 increases, power consumption increases, or cross talk due to EMI increases, may be prevented.

Figure 26:
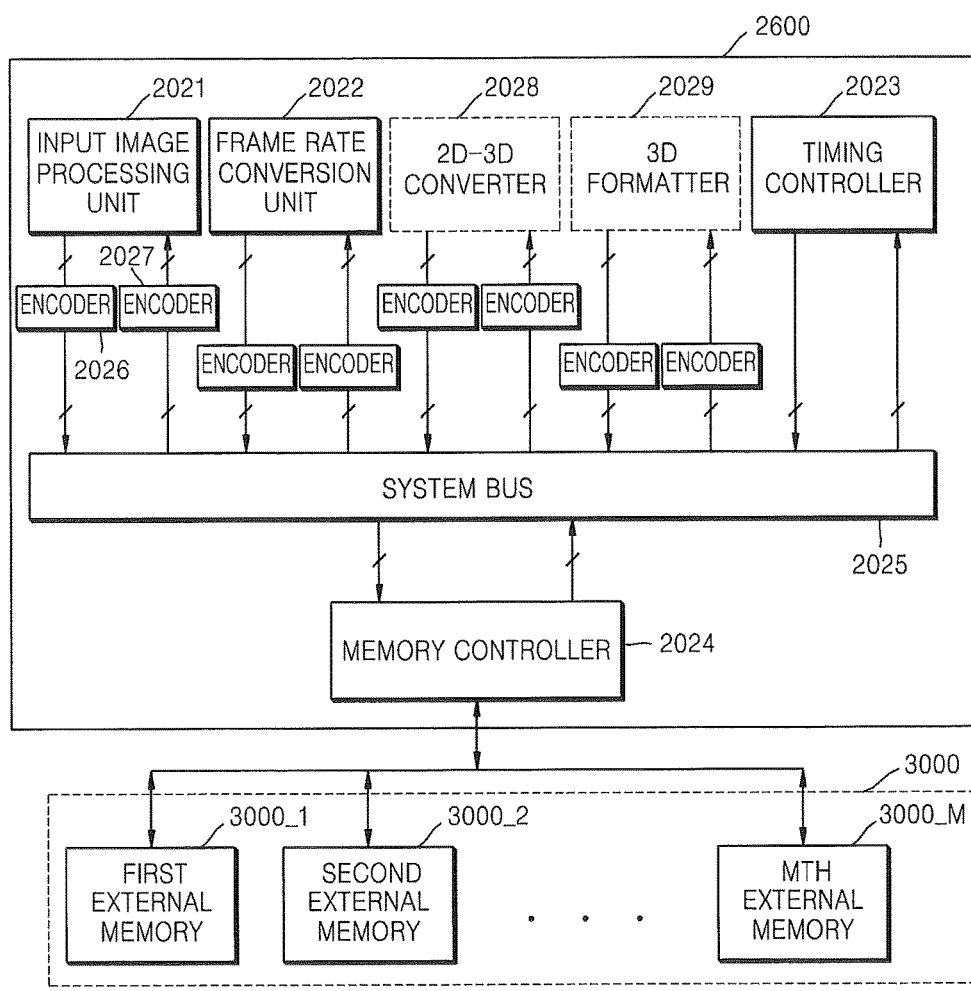
FIG. 26 is a block flow diagram of an image processing apparatus, according to another embodiment of the inventive concept.

FIG. 26 is a block flow diagram of an image processing apparatus 2600, according to another embodiment of the inventive concept. Referring to FIG. 26, the encoder 2026 and the decoder 2027 of the image processing apparatus 2100 may be disposed between each of the function blocks 2021, 2022, 2028, and 2029 and the system bus 2025. The encoder 2026 and the decoder 2027 of FIG. 26 may be similar to the encoder 2026 and the decoder 2027 of FIG. 20. However, an object encoded and decoded by the encoder 2026 and the decoder 2027 may be data that is transmitted and received to and from each of the function blocks 2021, 2022, 2028, and 2029 that process the data. The data that is transmitted and received to and from each of the function blocks 2021, 2022, 2028, and 2029 that process the data may be the same as the above-described input pixel data InD and encoded pixel data EnD.

Figure 27:
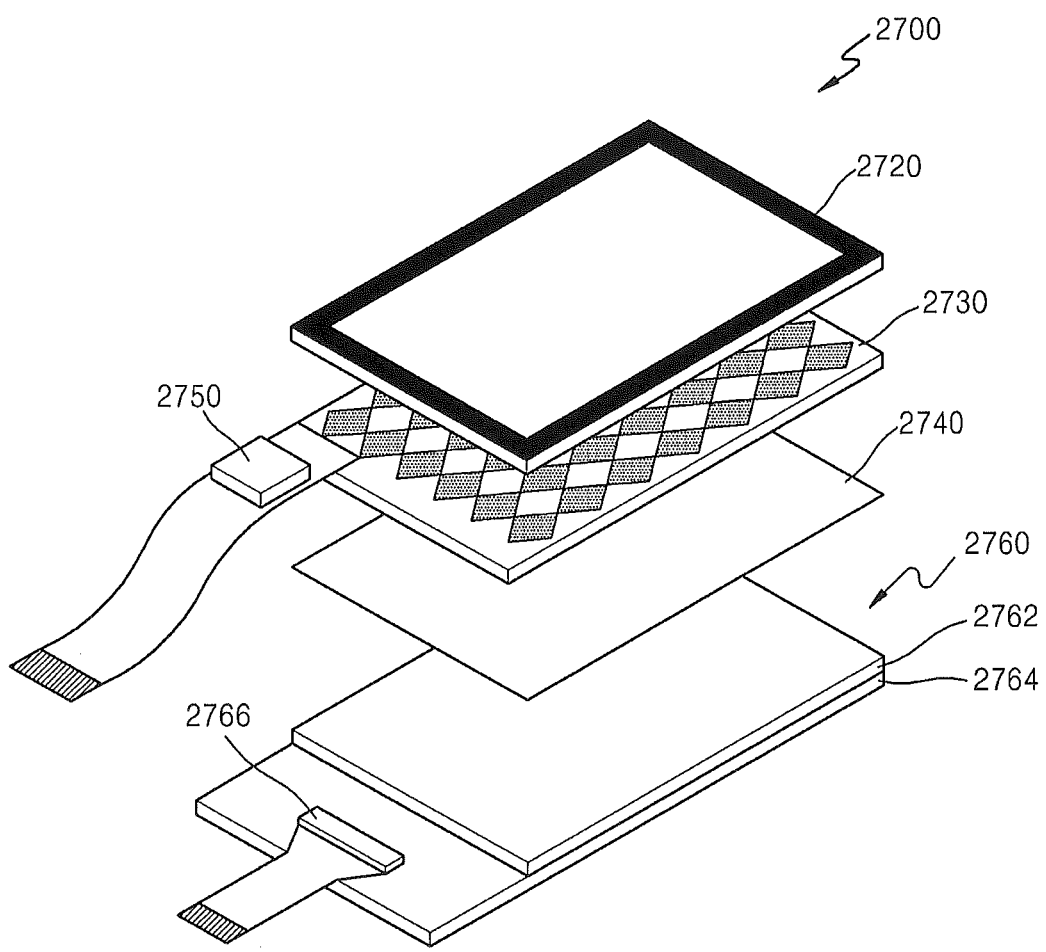
FIG. 27 is a diagram of a display module, according to an embodiment of the inventive concept.

FIG. 27 is a diagram of a display module 2700, according to an embodiment of the inventive concept. Referring to FIG. 27, the display module 2700 may include a window glass 2720, a polarizing plate 2740, and a display apparatus 2760. The window glass 2720 is generally formed of an acrylic material or a tempered glass material to protect the display module 2700 from being scratched by an external shock or a repetitive touch. The polarizing plate 2740 may be used to improve an optical characteristic of a display panel 2762 of the display apparatus 2760.

The display apparatus 2760 includes the display panel 2762, a printed circuited board (PCB) 2764, and a display driving chip 2766. The display panel 2762 may be formed by patterning a transparent electrode on the PCB 2764. The display panel 2762 may include a plurality of pixel cells for displaying a frame. The display panel 2762 according to an embodiment may be an organic light-emitting diode (OLED) panel. Each pixel cell includes an OLED that emits light in response to a current flow. However, the inventive concept is not limited thereto. The display panel 2762 may include various types of display devices. For example, the display panel 2726 may be one of a liquid crystal display (LCD), an electrochromic display (ECD), a digital mirror device (DMD), an actuated mirror device (AMD), a grating light value (GLV), a plasma display panel (PDP), an electro luminescent display (ELD), a light emitting diode (LED) display, and a vacuum fluorescent display (VFD).

The display driving chip 2766 may include the image processing apparatus 100 of FIG. 1. Although the display apparatus 2760 includes one display driving chip 2766 in FIG. 17, the inventive concept is not limited thereto. The display apparatus 2760 may include a plurality of driving chips. The display driving chip 2766 of FIG. 27 is mounted in a chip on glass (COG) on the PCB 2764 formed of a glass material. However, the inventive concept is not limited thereto. The display driving chip 2766 may be mounted in various forms such as a chip on film (COF), a chip on board (COB), etc.

The display module 2700 may further include a touch panel 2730 and a touch controller 2750. The touch panel 2730 is formed by patterning a transparent electrode, for example, formed of indium tin oxide (ITO) on a glass substrate or a polyethylene terephthalate (PET) film. The touch controller 2750 detects a touch that occurs on the touch panel 2730, calculates a touch coordinate, and transfers the touch coordinate to a host (not shown). The touch controller 2750 and the display driving chip 2766 may be integrated into a single semiconductor chip.

Figure 28:
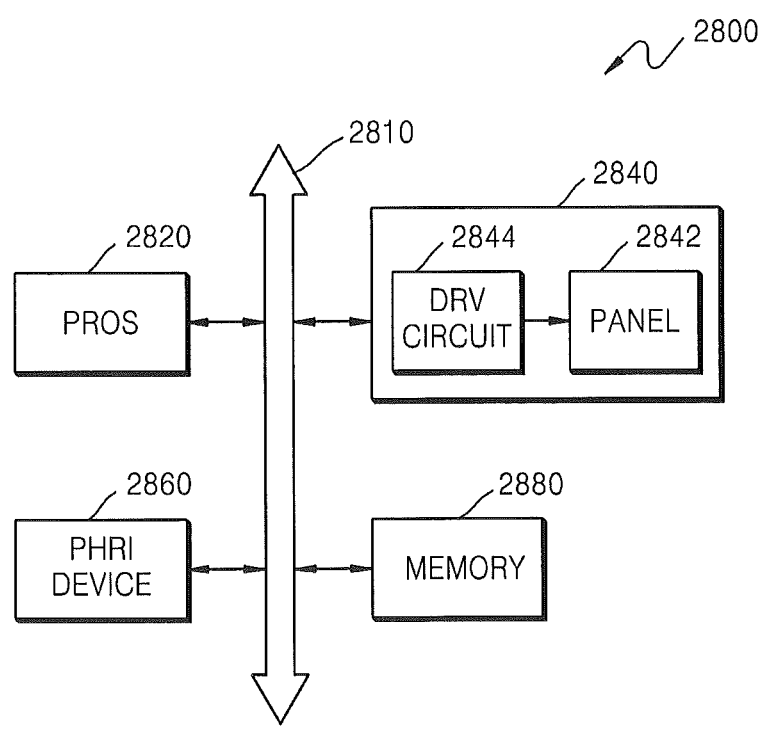
FIG. 28 is a block diagram of a display system, according to an embodiment of the inventive concept.

FIG. 28 is a block diagram of a display system 2800, according to some embodiments of the inventive concept. Referring to FIG. 28, the display system 2800 may include a processor 2820, a display apparatus 2840, a peripheral apparatus 2860, and a memory 2880 that are electrically connected to a system bus 2810. The display system 2800 may be included in a smart TV or a mobile electronic product. The processor 2820 may control data input and output of the display apparatus 2840, the peripheral apparatus 2860, and the memory 2880 and process image processing of image data transmitted between the display apparatus 2840, the peripheral apparatus 2860, and the memory 2880.

The display apparatus 2840 includes a panel 2842 and a driving circuit 2844, stores image data applied via the system bus 2810 in a frame memory included in the driving circuit 2844, and displays the image data on the panel 2842. The display apparatus 2840 may include the image processing apparatus 100 of FIG. 1. The peripheral apparatus 2860 may be an apparatus for converting a moving image or a still image into an electrical signal such as a camera, a scanner, or a webcam. Image data obtained by the peripheral apparatus 2860 may be stored in the memory 2880 or may be displayed on the panel 2842 of the display apparatus 2840 in real time.

The memory 2880 may include a volatile memory device such as DRAM or a non-volatile memory device such as flash memory. The memory 2880 may include DRAM, PRAM, MRAM, ReRAM, FRAM, NOR flash memory, NAND flash memory, or a fusion flash memory (for example, a combined memory of a SRAM buffer, the NAND flash memory, and an NOR interface logic). The memory 2880 may store the image data obtained from the peripheral apparatus 2860 or an image signal processed by the processor 2820.

Figure 29:
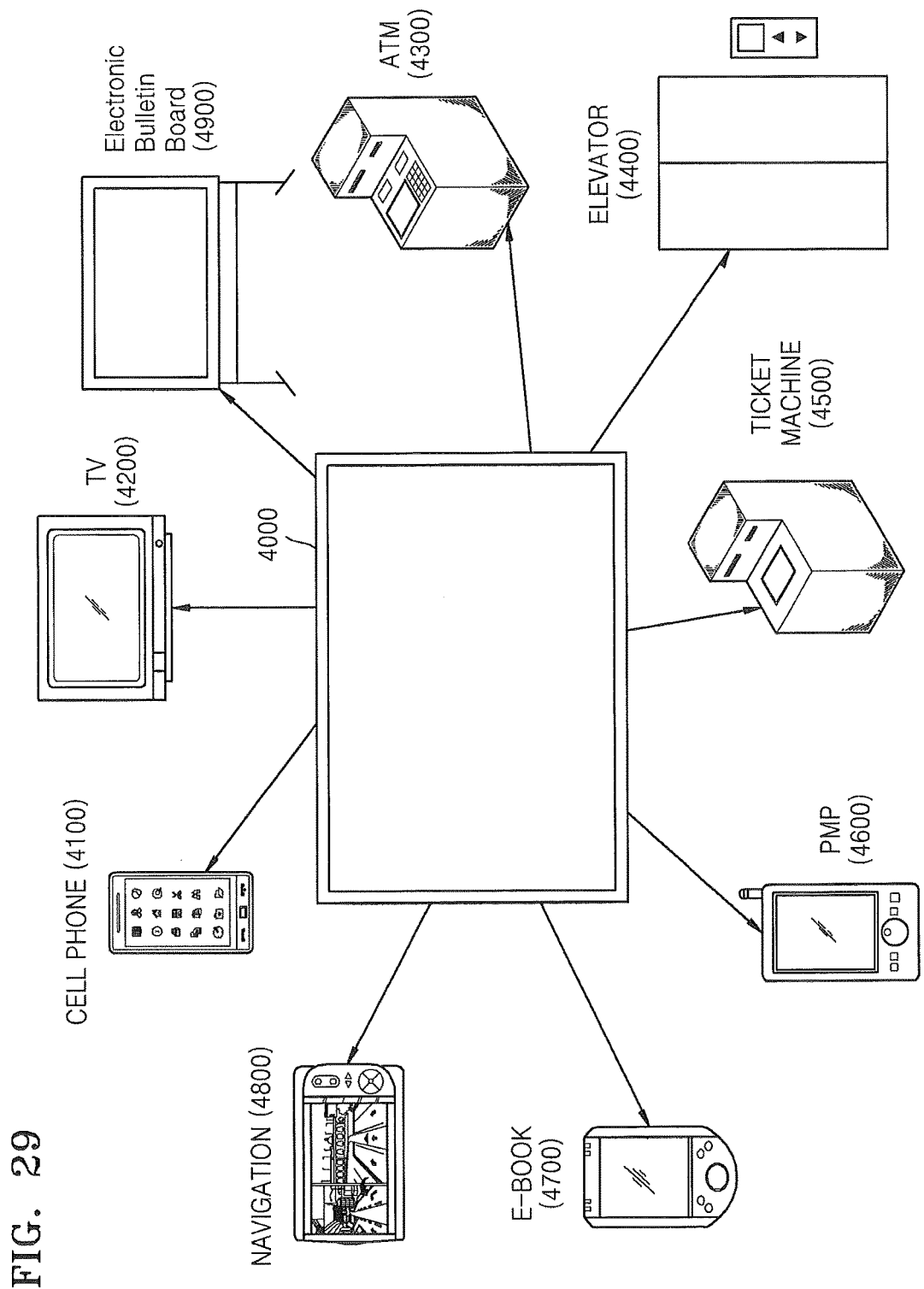
FIG. 29 is a diagram of an application example of various electronic products in which an image processing apparatus is installed, according to an embodiment of the inventive concept.

FIG. 29 is a diagram of an application example of various electronic products in which an image processing apparatus is installed, according to an embodiment of the inventive concept. Referring to FIG. 29, the image processing apparatus 4000 of FIG. 1 may be employed in various electronic products. For example, the image processing apparatus of FIG. 1 may be widely used in cellular phones 4100, TVs 4200, automated teller machines (ATMs) 4300 as used in banks, elevators 4400, ticket dispensers 4500, PMPs 4600, E-books 4700, navigation systems 4800, and electronic boards 4900.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An image processing apparatus comprising:
   an input image processing circuit configured to output global information of sample data obtained by sampling first image data and dividing and outputting the first image data into an N number of split image data, wherein N is a positive integer equal to or greater than 2; and
   a frame rate conversion circuit comprising an N number of frame rate converters, wherein each of the N number of frame rate converters is configured to convert a frame rate of corresponding split image data among the N number of split image data synchronized with the global information and to output the frame rate converted split image data as split display data, wherein the split display data is to be displayed on one of an N number of display regions,
   wherein the global information is information applied to all of the N number of split image data,
   wherein the input image processing circuit is configured to:
      receive the first image data;
      sample the first image data and generate the sample data;
      generate global information of the first image data based on the sample data;
      divide the first image data into the N number of spilt image data and output the N number of split image data and the global information;
      estimate a motion of the sample data;
      generate a reduction motion vector; and
      output the reduction motion vector,
   wherein each of the N number of frame rate converters is configured to:
      expand the reduction motion vector to an expansion motion vector;
      estimate a motion of the split image data and generate a temporary motion vector of the split image data based on the expansion motion vector;
      improve a motion vector value of boundary regions of adjacent display regions of the split image data based on the temporary motion vector and the expansion motion vector obtained by expanding the reduction motion vector and generate an improvement motion vector;
      interpolate continuous frames of the split image data based on the improvement motion vector, convert a frame rate of continuous frames, and generate the split display data; and
      output the split display data.

2. The image processing apparatus of claim 1, wherein each of the N number of frame rate converters is configured to improve boundary regions of adjacent display regions of the split image data based on the expansion motion vector obtained by expanding the reduction motion vector.

3. The image processing apparatus of claim 1, wherein each of the N number of frame rate converters comprises a 3D converter configured to convert the frame rate converted split image data into 3D data, and to output the 3D data as the split display data.

4. The image processing apparatus of claim 1, wherein each of the N number of frame rate converters is configured as a separate chip.

5. An image processing apparatus comprising:
   an input image processing circuit for outputting global information of sample data obtained by sampling first image data and dividing and outputting the first image data into an N number of split image data, wherein N is a positive integer equal to or greater than 2; and
   a frame rate conversion circuit comprising an N number of frame rate converters, wherein each of the N number of frame rate converters converts a frame rate of corresponding split image data among the N number of split image data synchronized with the global information and outputs the frame rate converted split image data as split display data, wherein the split display data is to be displayed on one of an N number of display regions,
   wherein the input image processing circuit is configured to:
      receive the first image data and second image data having a resolution lower than that of the first image data;
      receive the first image data, sample the first image data, and generate the sample data;
      receive one of the sample data and the second image data, generate global information of one of the first image data and the second image data, estimate a motion of one of the sample data and the second image data, and generate a reduction motion vector of one of the sample data and the second image data;
      scale the second image data to the resolution of the first image data and generate upsize image data; and
      divide one of the first image data and the upsize image data into the N number of split image data and output the N number of split image data, the reduction motion vector, and the global information.

6. The image processing apparatus of claim 5, wherein the first image data is ultra high definition (HD) image data, and the second image data is full HD image data.

7. An image processing apparatus comprising:
   a frame rate conversion circuit comprising a plurality of frame rate converters, wherein each of the plurality of frame rate converters is configured to:
      receive split image data divided from image data;
      receive global information of the image data generated based on a difference between values of macro blocks between continuous frames of sample data sampled from the image data;
      convert a frame rate of the split image data synchronized with the global information; and
      output the frame rate converted split image data; and
   a first motion estimation circuit configured to perform motion estimation on the sample data to calculate a reduction motion vector based on the difference between the values of the macro blocks between the continuous frames of the sample data, wherein the reduction motion vector is applied to each of the plurality of frame rate converters,
   wherein the global information is applied to each of the plurality of frame rate converters,
   wherein the converted split image data is output as split display data to be displayed on one of a plurality of display regions corresponding the plurality of frame rate converters, and wherein each of the plurality of frame rate converters is further configured to:
      expand the reduction motion vector to an expansion motion vector based on the global information; and equalize values of motion vectors in macro blocks in boundary regions between adjacent display regions of the split image data based on the expansion motion vector.

8. The image processing apparatus of claim 7, wherein the global information comprises at least one of a flash effect, a film mode, panning and a scene change.

9. The image processing apparatus of claim 8, further comprising a global information generation circuit configured to determine that a scene change takes place when the difference between the values of the macro blocks between the continuous frames of the sample data is greater than a reference value.

* * * * *